United States Patent
Takeyoshi et al.

(10) Patent No.: US 7,577,105 B2
(45) Date of Patent: Aug. 18, 2009

(54) COOPERATION INFORMATION MANAGING APPARATUS AND GATEWAY APPARATUS FOR USE IN COOPERATION INFORMATION MANAGING SYSTEM

(75) Inventors: Haruyuki Takeyoshi, Kawasaki (JP); Yoichiro Igarashi, Kawasaki (JP); Masaaki Takase, Kawasaki (JP); Mitsuaki Kakemizu, Kawasaki (JP); Shinya Yamamura, Yokohama (JP)

(73) Assignee: Fujitsu Limited, Kawasaki (JP)

( * ) Notice: Subject to any disclaimer, the term of this patent is extended or adjusted under 35 U.S.C. 154(b) by 759 days.

(21) Appl. No.: 10/871,909

(22) Filed: Jun. 17, 2004

(65) Prior Publication Data

US 2005/0129034 A1 Jun. 16, 2005

(30) Foreign Application Priority Data

Dec. 11, 2003 (JP) .............................. 2003-413568

(51) Int. Cl.
*H04L 12/28* (2006.01)
*H04L 12/56* (2006.01)
*G06F 15/173* (2006.01)
*G06F 15/16* (2006.01)
*G06F 9/00* (2006.01)

(52) U.S. Cl. ........................ 370/254; 370/401; 709/224; 709/229; 709/234; 709/244; 712/225

(58) Field of Classification Search ................. 370/400; 709/244, 234, 229, 224; 712/225
See application file for complete search history.

(56) References Cited

U.S. PATENT DOCUMENTS

| | | | | |
|---|---|---|---|---|
| 6,041,349 | A | * | 3/2000 | Sugauchi et al. ............ 709/223 |
| 6,094,682 | A | * | 7/2000 | Nagasawa .................... 709/224 |
| 6,324,577 | B1 | * | 11/2001 | Hirai ........................... 709/223 |
| 6,333,919 | B2 | * | 12/2001 | Gaffney ....................... 370/254 |
| 7,072,954 | B1 | * | 7/2006 | Ezaki et al. .................. 709/223 |
| 7,131,141 | B1 | * | 10/2006 | Blewett et al. ................ 726/12 |

(Continued)

FOREIGN PATENT DOCUMENTS

JP 2001-169341 6/2001

(Continued)

OTHER PUBLICATIONS

B. Aboba. The Network Access Identifier. IETF Network Working Group 1999, pp. 1-8.

(Continued)

*Primary Examiner*—Hassan Kizou
*Assistant Examiner*—Ryan C. Kavleski
(74) *Attorney, Agent, or Firm*—Katten Muchin Rosenman LLP

(57) ABSTRACT

In a system including a first unit retaining a first identifier and a second unit retaining a second identifier for reading out the first identifier from the first unit to transmit, as cooperation information, a combination of the first identifier and the second identifier, for managing the cooperation information, a cooperation information managing apparatus receives the cooperation information and registers the second identifier included in the cooperation information and a group of a plurality of first identifiers including the first identifier included in the cooperation information in a state associated with each other. For managing objects to be used by a user, this enables managing the objects as an aggregation without handling the objects individually, thereby realizing efficient management from a user's point of view.

5 Claims, 37 Drawing Sheets

U.S. PATENT DOCUMENTS

| | | | |
|---|---|---|---|
| 2003/0043070 A1* | 3/2003 | Soliman | 342/357.09 |
| 2004/0033779 A1* | 2/2004 | Ochi et al. | 455/11.1 |
| 2004/0081178 A1* | 4/2004 | Fujimori | 370/401 |
| 2004/0082346 A1* | 4/2004 | Skytt et al. | 455/456.3 |
| 2004/0133689 A1* | 7/2004 | Vasisht | 709/228 |
| 2004/0258032 A1* | 12/2004 | Kawamura | 370/338 |
| 2005/0232191 A1* | 10/2005 | Wills | 370/328 |
| 2005/0259620 A1* | 11/2005 | Igarashi et al. | 370/331 |
| 2007/0165865 A1* | 7/2007 | Talvitie | 380/286 |

FOREIGN PATENT DOCUMENTS

| | | | |
|---|---|---|---|
| JP | 2002-077185 | | 3/2002 |
| JP | 2002-344477 | | 11/2002 |
| JP | 2003209875 | | 7/2003 |
| SE | WO 99/67765 | * | 6/1999 |

OTHER PUBLICATIONS

C. Perkins. IP Mobility Support. Network Working Group.1996, pp. 1-79.

Notification of Reason(s) for Refusal, dated Aug. 26, 2008, for corresponding Japanese Patent Application JP 2003-413568.

* cited by examiner

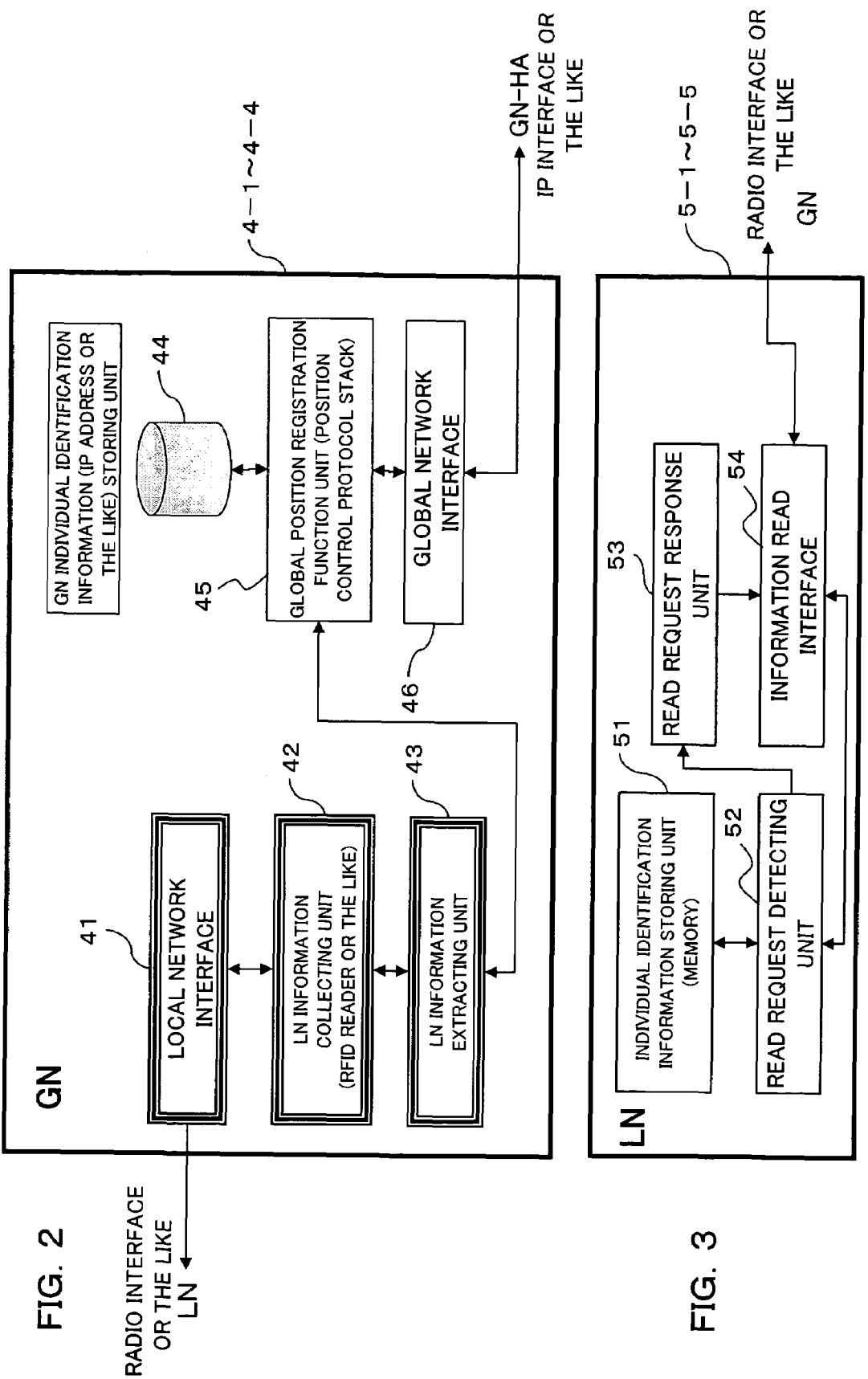

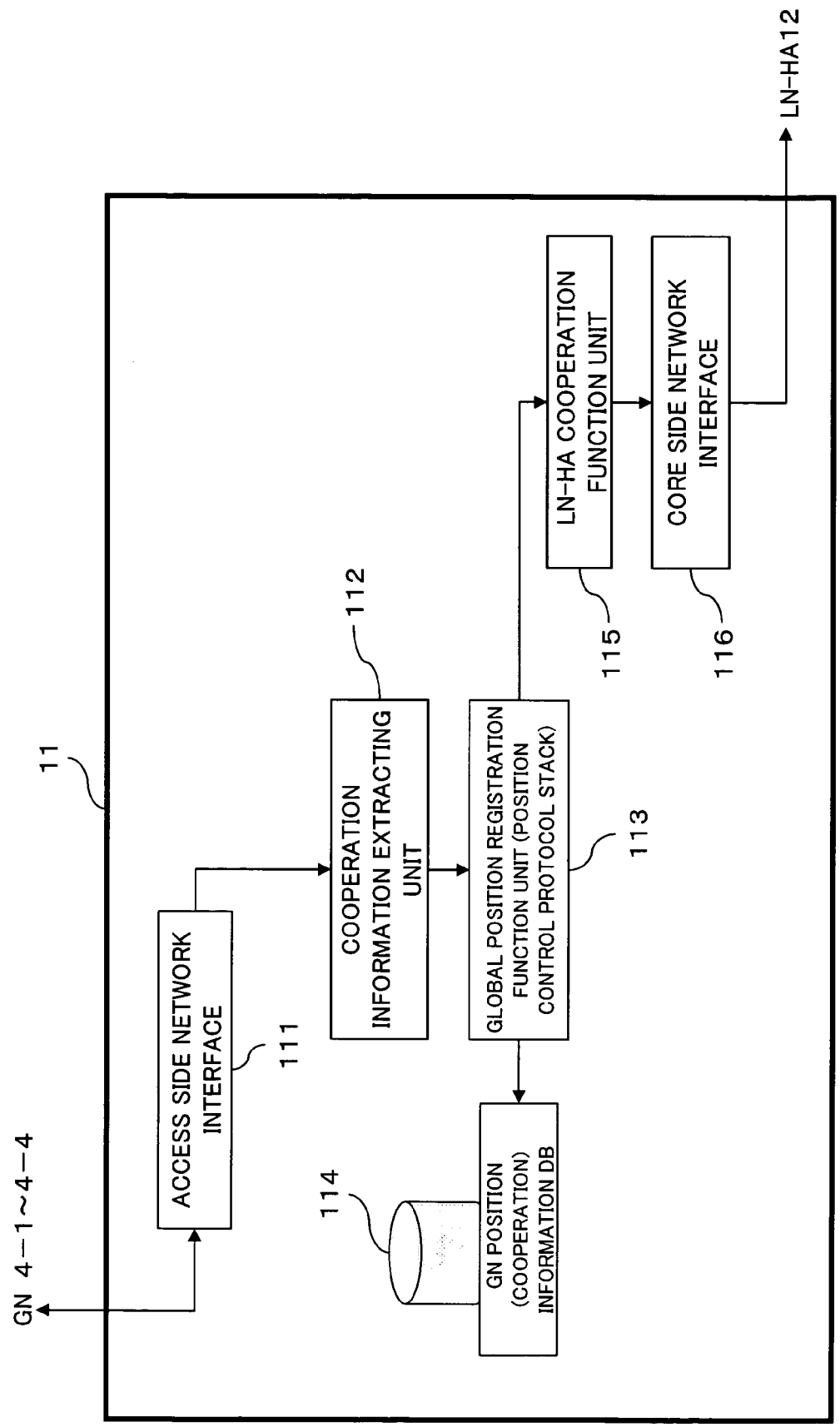

FIG. 7

| ITEM NO. | MESSAGE NAME | TRANSMISSION DIRECTION (TRANSMITTING SIDE →RECEIVING SIDE) | PARAMETER INCLUDED |
|---|---|---|---|
| 1 | GN-IP ADDRESS REQUEST MESSAGE | GW→LN-HA | LN-ID |
| 2 | GN-IP ADDRESS RESPONSE MESSAGE | LN-HA→GW | GN-IP ADDRESS |

FIG. 8

| ITEM NO. | MESSAGE NAME | TRANSMISSION DIRECTION (TRANSMITTING SIDE →RECEIVING SIDE) | PARAMETER INCLUDED |
|---|---|---|---|
| 1 | GN-IP ADDRESS REQUEST MESSAGE | xSP SERVER→GW | LN-ID |
| 2 | GN-IP ADDRESS RESPONSE MESSAGE | GW→xSP SERVER | GN-IP' ADDRESS |

FIG. 13

| ITEM NO. | MESSAGE NAME | TRANSMISSION DIRECTION (TRANSMITTING SIDE → RECEIVING SIDE) | PARAMETER INCLUDED |
|---|---|---|---|
| 1 | COOPERATION INFORMATION REGISTRATION MESSAGE | GN-HA → GW | LN-ID, GN-IP ADDRESS, LN-HA IP ADDRESS |
| 2 | COOPERATION INFORMATION RESPONSE MESSAGE | GW → GN-HA | PROCESSING RESULT (OK, NG) |

FIG. 14

| ITEM NO. | MESSAGE NAME | TRANSMISSION DIRECTION (TRANSMITTING SIDE →RECEIVING SIDE) | PARAMETER INCLUDED |
|---|---|---|---|
| 1 | COOPERATION INFORMATION REGISTRATION MESSAGE | GW→LN-HA | LN-ID, CONVERTED GN-IP ADDRESS |
| 2 | COOPERATION INFORMATION RESPONSE MESSAGE | LN-HA→GW | PROCESSING RESULT (OK, NG) |

FIG. 15

| ITEM NO. | MESSAGE NAME | TRANSMISSION DIRECTION (TRANSMITTING SIDE →RECEIVING SIDE) | PARAMETER INCLUDED |
|---|---|---|---|
| 1 | COOPERATION INFORMATION REGISTRATION MESSAGE | xSP SERVER→LN-HA | LN-ID |
| 2 | COOPERATION INFORMATION RESPONSE MESSAGE | LN-HA→xSP SERVER | GN-IP' |

FIG. 20

| ITEM NO. | MESSAGE NAME | TRANSMISSION DIRECTION (TRANSMITTING SIDE →RECEIVING SIDE) | PARAMETER INCLUDED |
|---|---|---|---|
| 1 | APPLIANCE (LN) COOPERATION INFORMATION REGISTRATION MESSAGE | GN→LN-HA | LN-ID, GN-IP ADDRESS, REGISTRATION FLAG |
| 2 | APPLIANCE (LN) COOPERATION INFORMATION REGISTRATION RESPONSE MESSAGE | LN-HA→GN | PROCESSING RESULT (OK, NG), NG CONTENTS (IN USE) |

FIG. 22

| ITEM NO. | MESSAGE NAME | TRANSMISSION DIRECTION (TRANSMITTING SIDE →RECEIVING SIDE) | PARAMETER INCLUDED |
|---|---|---|---|
| 1 | APPLIANCE (LN) COOPERATION INFORMATION CANCELLATION MESSAGE | GN→LN-HA | LN-ID, GN-IP ADDRESS, CANCELLATION FLAG |
| 2 | APPLIANCE (LN) COOPERATION INFORMATION CANCELLATION RESPONSE | LN-HA→GN | PROCESSING RESULT (OK, NG) |

FIG. 24

| ITEM NO. | MESSAGE NAME | TRANSMISSION DIRECTION (TRANSMITTING SIDE → RECEIVING SIDE) | PARAMETER INCLUDED |
|---|---|---|---|
| 1 | APPLIANCE (LN) CONTROL MESSAGE | LN-HA → APPLIANCE CONTROLLER | APPLIANCE CONTROLLER IP ADDRESS, CONTROL CONTENTS (POWER ON/OFF, PLAY, CHANNEL SWITCHING) |
| 2 | APPLIANCE (LN) RESPONSE MESSAGE | APPLIANCE CONTROLLER → LN-HA | PROCESSING RESULT (OK, NG), NG CONTENTS (CONNECTION FAILURE, ETC) |

FIG. 29(A)

| LN-ID | GN-ID |
|---|---|
| LN-ID1 | GN-ID2 |
| ~~LN-ID2~~ | ~~GN-ID1~~ |

← DELETE

FIG. 29(B)

| LN-ID | LN-ID |
|---|---|
| GN-ID2 | LN-ID1 |
| ~~GN-ID1~~ | ~~LN-ID2~~ |

← DELETE

FIG. 29(C)

| GN-ID | LN-ID |
|---|---|
| GN-ID2 | LN-ID2 |

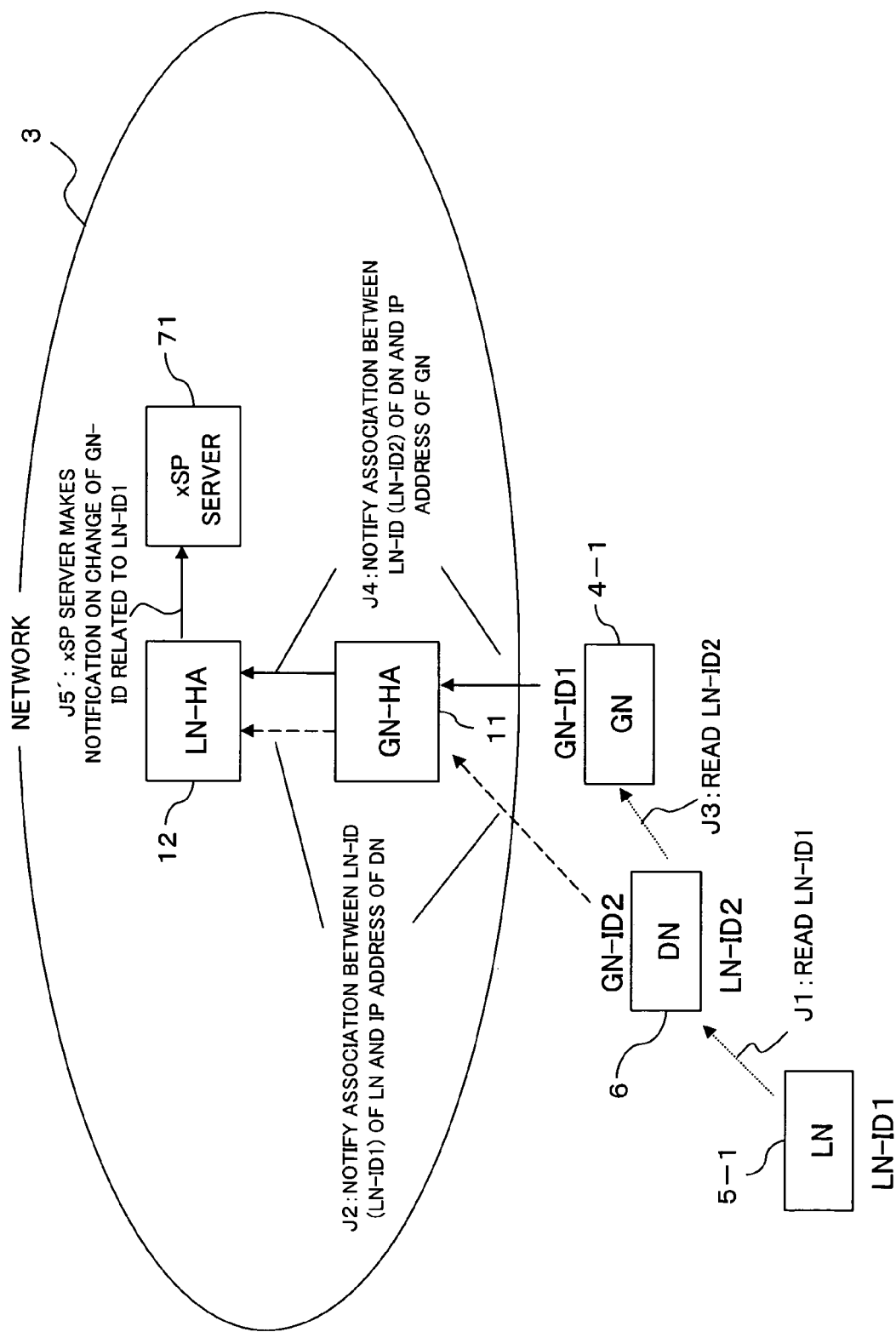

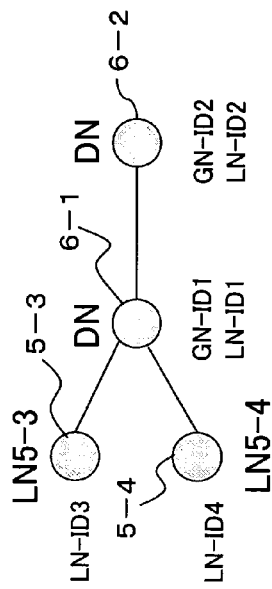

FIG. 32

| ITEM NO. | MESSAGE NAME | TRANSMISSION DIRECTION (TRANSMITTING SIDE →RECEIVING SIDE) | PARAMETER INCLUDED |
|---|---|---|---|
| 1 | COOPERATION INFORMATION CHANGE NOTIFICATION MESSAGE | LN-HA→xSP SERVER | LN-ID, PRESENT GN-ID, OLD GN-ID |
| 2 | COOPERATION INFORMATION CHANGE NOTIFICATION RESPONSE MESSAGE | xSP SERVER→LN-HA | OK or NG |

FIG. 33

| ITEM NO. | MESSAGE NAME | TRANSMISSION DIRECTION (TRANSMITTING SIDE → RECEIVING SIDE) | PARAMETER INCLUDED |
|---|---|---|---|
| 1 | COOPERATION INFORMATION CANCELLATION REQUEST MESSAGE | GN FUNCTION NODE → LN-HA | PRESENT GN-ID, LN-ID OF DN READ |
| 2 | COOPERATION INFORMATION CANCELLATION RESPONSE MESSAGE | LN-HA → GN FUNCTION NODE | OK or NG |

FIG. 34(A)

LN-ID3 MANAGEMENT TABLE ~16

| SESSION ID | LN-ID | GN-ID |
|---|---|---|
| LN-ID3 SESSION | LN-ID3 | GN-ID1 |
| | LN-ID1 | ~~GN-ID2~~ → DELETE |
| | ~~LN-ID2~~ | |

FIG. 34(B)

LN-ID4 MANAGEMENT TABLE ~17

| SESSION ID | LN-ID | GN-ID |
|---|---|---|
| LN-ID4 SESSION | LN-ID4 | GN-ID1 |
| | LN-ID1 | ~~GN-ID2~~ → DELETE |
| | ~~LN-ID2~~ | |

FIG. 34(C)

DN DATABASE ~18

| GN-ID | LN-ID |
|---|---|
| GN-ID1 | LN-ID1 |
| GN-ID2 | LN-ID2 |
| GN-ID3 | LN-ID3 |

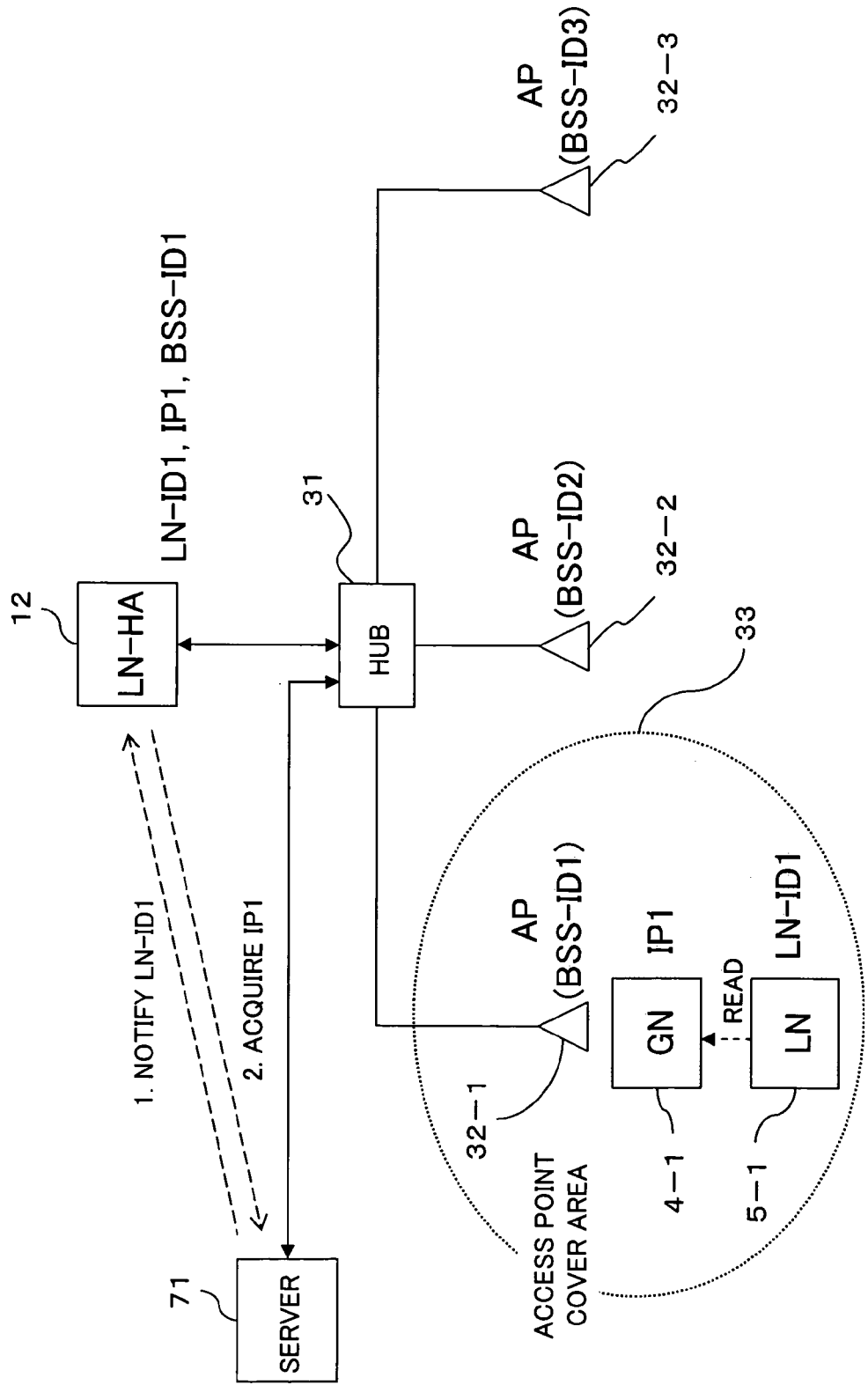

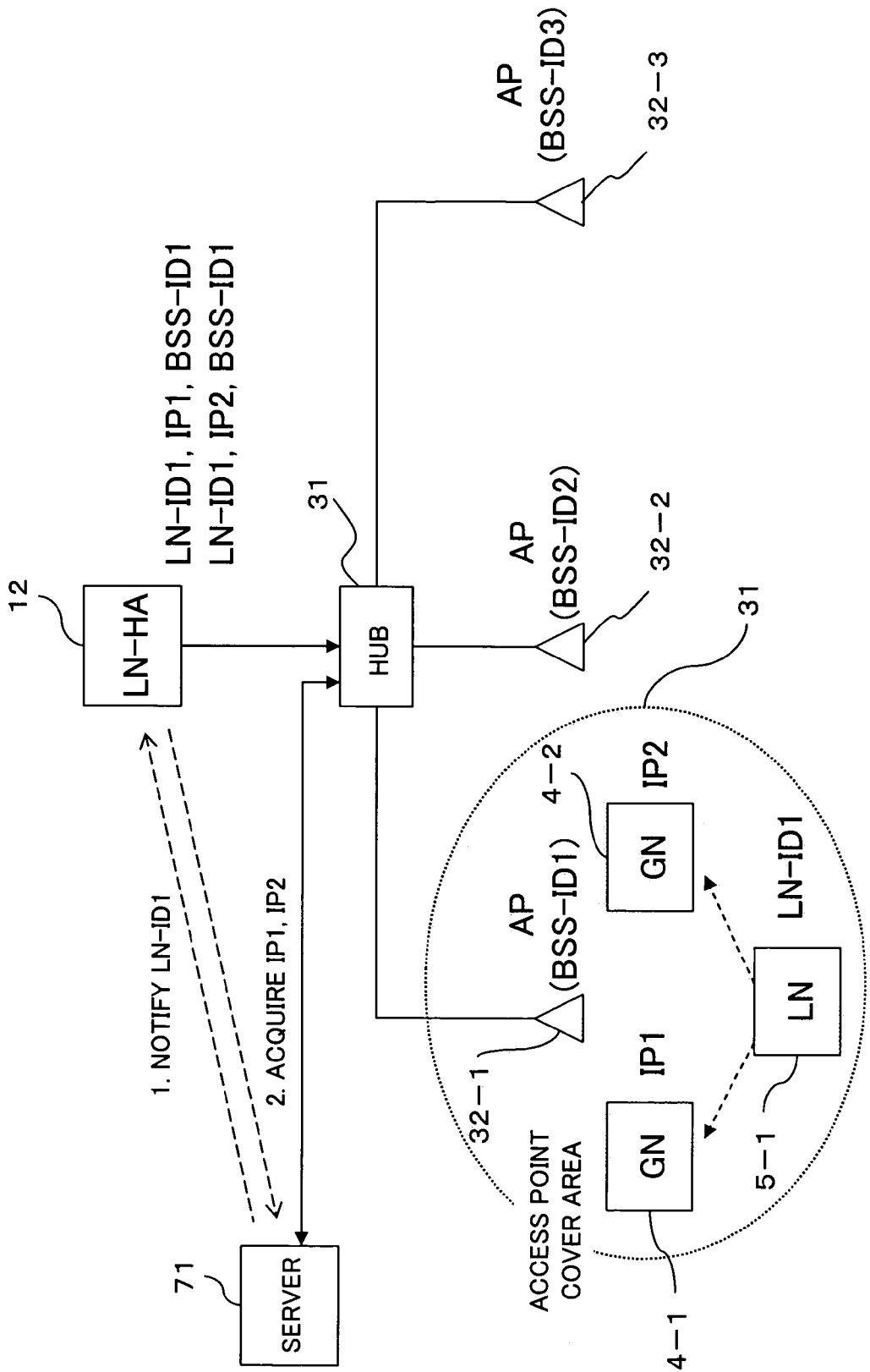

COOPERATION INFORMATION MANAGING APPARATUS AND GATEWAY APPARATUS FOR USE IN COOPERATION INFORMATION MANAGING SYSTEM

BACKGROUND OF THE INVENTION (1) Field of the Invention

The present invention relates to a cooperation (linkage) information managing apparatus and a gateway apparatus for use in a cooperation information managing system, and more particularly to a technique suitable for providing a desired service to specific users who retain equipment connectable to a network such as IP (Internet Protocol) network.

(2) Description of the Related Art

With the recent progress of the radio chip integration technique, as the substitute for the conventional bar codes (individual identification information) put on books and CDs (music compact disks), a readable/writable RF-ID (Radio Frequency ID) tag (radio tag) has appeared, which is expectable to be used as an information recording medium over a wider range in the fields of distribution management, manufacturing process management in a factory, or the like in the future. It is expectable that the spread scale of this RF-ID tag will considerably exceeds that of the bar code, and considering the RF-ID tag as one element of a network service, there would be a need to employ a management system larger in scale.

For example, as one mode of the network service in the future, it is expectable to provide an appliance located around users. In this case, the "appliance" signifies a "thing" retaining individual identification information and using this individual identification information as a communication means for making communications with other apparatus. The appliance (equally referred to as an object) provides, to a user, a function unrealizable through the use of only a terminal device (for example, a portable telephone) the user retains individually.

That is, by temporarily utilizing an appliance (for example, pointing device, headphone, or the like) located around a user, the user can receives, as a service, the offering of a function unrealizable by only the terminal device the user retains individually. Incidentally, the appliance can be a thing (for example, a building, a sign, a can, or the like) which does not provide any function directly to the user's terminal device, or it can also be a public thing and a personal property.

Considering a world in which an appliance forming each of diverse personal "things" becomes recognizable by means of an RF-ID tag or the like, in a network field, the present invention provides a service using the information on these appliances.

In this connection, as means for individually managing the position of a user's mobile terminal (MN: Mobile Node), there has been known a mobile IP (see non-patent document "IP Mobility Support", [online], September, 1996, IETF Network Working Group [Retrieved on Dec. 10, 2003], Internet <URL: http://www.ietf.org/rfc/rfc2002.txt>) in the layer 3 [IP (Internet Protocol) layer].

This mobile IP relates to a technique in which the MN can make continuous communications while moving among a plurality of subnetworks configured through the use of the IP network, and the MN has an address (referred to as a home address) independent of the subnetwork to which it pertains at present and an address [referred to as a care of address (CoA)] dependent on the subnetwork.

In addition, with the movement, the MN properly transmits each of the aforesaid addresses to a position managing apparatus for the MN, called home agent (HA), for the position registration, while the HA stores and manages these addresses in a state associated therewith, thereby individually managing the present position of the MN. When transmitting a packet to the MN, a terminal (CN: Correspondent Node) forming the other end with respect to the MN transmits a packet to the home address of this MN, and when receiving the packet issued to the home address of this MN, the HA encapsulates this packet to transfer it to the latest care of address corresponding to the home address. Therefore, the MN can normally receive the packet from the CN even if the care of address varies due to the movement among the subnetworks to continue the communication with the CN.

Still additionally, as a technique related to the mobile IP, there has been known a technique (see Japanese Patent Laid-Open No. 2001-169341) in which the HA authorizes whether or not one MN is a normal user' terminal. Yet additionally, as a technique to identify the user of a terminal device connected through a network, there has been known a technique (non-patent document "The Network Access Identifier", [online], January, 1999, IETF Network Working Group, [retrieved on Dec. 10, 2003], Internet <URL: http://www.ietf.org/rfc/rfc2486.txt>) using NAI (Network Access Identifier).

In the case of a service which provides the aforesaid appliance to a user, it needs that the service providing side (server or the like) recognizes the association (that is, relationship in use) between a given appliance and a user using this appliance and, for example, in a case in which the network is enhanced in scale, there is a need to examine a cooperation managing facility (device) for quickly and efficiently carrying out operations such as registration, renewal and deletion of information (cooperation information) on the use relationship in conjunction with the scale enhancement (ensuring the scalability).

Moreover, the association (correspondence) between the appliance and the user using this is not always one to one (for example, one-to-many relation can be considered, such as a case using the shared use of a printer or the like) and, hence, there is a need for a cooperation managing facility dealing with this.

Still moreover, the recognition of the aforesaid association also enables realizing a service (service executable according to a situation at that site and adjustable in contents is referred to as a "context aware" service) in which desired contents such as advertisement information and emergency message for a service user having cooperation information on a specific object [in other words, satisfying a given context (situation or environment about an item)] are transferred on the basis of an attribute of an object (article, electric product or the like to which an RF-ID tag is attached) scattered in the real world, an attribute of location (tag attribute showing a characteristic of that position, for example, "conference room" and others), or the like. Also in this case, there is a need to examine a cooperation information managing facility for preventing the occurrence of a situation in which, for example, the performance (the speeds of a memory, CPU, interface or the like) of the contents receiving side (network terminal) becomes insufficient.

Yet moreover, for realizing the aforesaid "context aware" service, in a case in which the communication requires the use of a network of a different carrier (or provider), if a network of one carrier directly provides the cooperation information on a user having a specific IP address to a node in a network of another carrier, difficulty is experienced in protecting the location privacy based on tag information on a user and the concealment of a "thing" the user retains. For this reason, a cooperation managing facility for avoiding this problem also becomes necessary.

SUMMARY OF THE INVENTION

The present invention has been developed with a view to eliminating the above-mentioned problems, and it is therefore an object of the invention to provide a technique for realizing the functions and facilities mentioned in the following (1) to (4).

(1) The configuration of a network under management considering the scalability of objects and reduction in operation cost.

(2) An extended cooperation information managing facility enabling a plurality of users to share (multi-use cooperation) a single appliance.

(3) Through the transfer of a GN (Global Node) function between nodes, the removal of restrictions and the like on the performance of a node functioning as GN.

(4) A facility for protecting the privacy on cooperation information at the communications between different types of carrier networks.

For this purpose, in accordance with an aspect of the present invention, there is provided a cooperation information managing apparatus made to manage cooperation information in a system including a first unit retaining a first identifier and a second unit retaining a second identifier for reading out the first identifier from the first unit to transmit, as the cooperation information, a combination of the first identifier and the second identifier, the cooperation information managing apparatus comprising receiving means for receiving the cooperation information, storing means for storing the cooperation information, and cooperation information registration control means for registering the second identifier included in the cooperation information received by the receiving means and a group of a plurality of first identifiers including the first identifier included in the cooperation information in the storing means in a state associated with each other.

In this configuration, it is also appropriate that the cooperation information managing apparatus further comprises associated group retaining means for retaining an associated group in which a plurality of first identifiers of first units each corresponding to said first unit are associated with each other in advance, and the cooperation information registration control means includes retrieving means for retrieving, in the associated group retaining means, an associated group to which the first identifier included in the cooperation information received by the receiving means pertains, registering means for registering the associated group retrieved by the retrieving means and the second identifier included in the cooperation information received by the receiving means in the storing means in a state associated with each other, and notifying means for notifying each of the identifiers pertaining to the associated group retrieved by the retrieving means to the second unit.

In addition, it is also appropriate that the cooperation information registration control means includes partial cooperation information deleting means for, upon receipt of a partial deletion request on a specific first identifier from the second unit, deleting this first identifier from the cooperation information in the storing means.

Still additionally, it is also appropriate that the cooperation information registration control means includes full cooperation information deleting means for, upon receipt of a full deletion request on the associated group from the second unit, deleting the cooperation information forming information on the association between the associated group and the second identifier from the storing means.

Yet additionally, it is also appropriate that the cooperation information managing apparatus further comprises hierarchically associated group retaining means for retaining a hierarchically associated group according to a parentage between a plurality of first identifiers of first units each corresponding to the first unit, and the cooperation information registration control means includes retrieving means for retrieving, in the hierarchically associated group retaining means, an associated group to which the first identifier included in the cooperation information received by the receiving means pertains as an high-order hierarchy identifier, registering means for registering the high-order hierarchical identifier of the hierarchically associated group retrieved by the retrieving means, a low-order hierarchical identifier associated with the high-order hierarchical identifier and the second identifier included in the cooperation information received by the receiving means in the storing means in a state associated with each other, and notifying means for notifying each of the identifiers pertaining to the associated group retrieved by the retrieving means to the second unit.

Furthermore, in accordance with another aspect of the present invention, there is provided a cooperation information managing apparatus made to manage cooperation information in a system including a first unit retaining a first identifier and a second unit retaining a second identifier for reading out the first identifier from the first unit to transmit, as the cooperation information, a combination of the first identifier and the second identifier, the cooperation information managing apparatus comprising shared number retaining means for retaining the number of second units currently using the first unit (which will be referred to hereinafter as "current use number") and an upper limit value of the number of the second units capable of sharing the first unit according to the first identifier, and sharing control means for, upon receipt of the cooperation information from the second unit, controlling the sharing (common use) of the first unit among the second units on the basis of each of the identifiers included in the cooperation information and the current use number and the upper limit value in the shared number retaining means.

Still furthermore, in accordance with a further aspect of the present invention, there is provided a cooperation information managing apparatus made to manage cooperation information in a system including a first unit retaining a first identifier to be read out by a different apparatus, a second unit, retaining a second identifier, for reading out the first identifier from the first unit to transmit, as the cooperation information, a combination of the first identifier and the second identifier and a third unit combining a function of the first unit and a function of the second unit, the cooperation information managing apparatus comprising first receiving means for receiving, as first cooperation information from the third unit, a combination of the first identifier of the first unit which is read out from the first unit by the third unit and the second identifier retained in the third unit, second receiving means for receiving, as second cooperation information from the second unit, a combination of the first identifier retained in the third unit and read out by the second unit from the third unit which reads out the first identifier of the first unit and the second identifier retained in the second unit, storing means for storing the cooperation information, and cooperation information registration control unit for registering, in the storing means, the first cooperation information received by the first receiving means and the second cooperation information received by the second receiving means in a state associated with each other.

In this arrangement, it is also appropriate that the cooperation information registration control unit includes association deleting means for, upon receipt of a request for cancellation of the association from the third unit, deleting the association between the first cooperation information and the second cooperation information in the storing means.

Moreover, it is also appropriate that the cooperation information registration control unit includes monitoring means for monitoring the production and cancellation of the association between the first cooperation information and the second cooperation information in the storing means, and a transmission destination change instructing means for, when the monitoring means confirms the production of the association, recognizing that the unit using the first unit is changed from the third unit to the second unit and transmitting, to the source of the information on the first unit, an instruction for changing the receiving side of the information on the first unit to the second unit and for, when the monitoring means confirms the cancellation of the association, recognizing that the unit using the first unit is changed from the second unit to the third unit and transmitting, to the source, an instruction for changing the receiving side of the information on the first unit to the third unit.

In addition, in accordance with a further aspect of the present invention, there is provided a gateway apparatus for use in a cooperation information managing system including a first unit retaining a first identifier, a second unit, retaining a second identifier, for reading out the first identifier from the first unit to transmit, as cooperation information, a combination of the first identifier and the second identifier, a cooperation information managing apparatus for receiving and managing the cooperation information and an information providing server for transmitting information on the first unit, the gateway apparatus comprising receiving means for receiving, from the cooperation information managing apparatus, the second identifier needed when the information providing server transmits the information on the first unit to the second unit which reads out the first identifier of the first unit, identifier converting means for converting the second identifier, received by the receiving means, into a different identifier for the notification to the information providing server, transmitting means for transmitting the identifier converted by the identifier converting means to the information providing server, and information transferring means for inverse-converting the converted identifier added to the information from the information providing server into the identifier before the conversion to transfer it to the second unit.

With the cooperation information managing apparatus according to the present invention, in the case of the management of the first unit (object) to be used by the second unit, the management of the first unit can be made in the form of the aggregation without handling the first unit as a single unit. Therefore, for example, the objects such as a printer toner and a mouse which are not operable independently are previously manageable as an aggregation of a printer and a printer toner and an aggregation of a notebook type personal computer and a mouse and, hence, the management efficient to a user is realizable. In consequence, the number of times of explicit registration (access) in the cooperation information managing apparatus by the user for the use of the object aggregation is considerably reducible.

In addition, with the cooperation information managing apparatus according to the present invention, since the objects can be allocated to the second unit according to the real-time using situation of the first unit (object) or the use condition such as the number of the first units usable at the same time, in the case of the objects such as public appliances or kiosk terminals simultaneously used by a plurality of users, the number of the objects usable at the same time and the real-time current use number thereof are manageable, thus realizing more practical and operable network architecture.

Still additionally, with the cooperation information managing apparatus according to the present invention, when a user using the third unit reads out the identifier of the third unit through the use of the second unit on purpose, the user changes the using unit from the third unit to the second unit so that the function of the second unit used by the third unit can temporarily be shifted to the second unit. Also in this case, the information on the first unit is continuously receivable by the second unit. Therefore, for example, in a case in which the performance of the third unit for the information reception falls short or is insufficient, the user can make the second unit with a sufficient performance read out the third unit which is in use to operate the second unit, thereby enabling the continuous information reception in the second unit.

Yet additionally, with the gateway apparatus according to the present invention, in a case in which the information providing server makes an inquiry at the cooperation information managing apparatus about the cooperation information, i.e., the second unit (second identifier) related to the first unit (first identifier), the second identifier returned in response to this inquiry is converted into a different identifier for the notification to the information providing server. This can realize desired data transfer to the second unit while concealing (suppressing) the privacy about the cooperation information.

BRIEF DESCRIPTION OF THE DRAWINGS

FIG. 2 is a functional block diagram showing a configuration of a GM shown in FIG. 1;

FIG. 3 is a functional block diagram showing a configuration of an LN shown in FIG. 1;

FIG. 4 is a functional block diagram showing a configuration of a GN-HA constituting a cooperation managing facility shown in FIG. 1;

FIG. 7 is an illustration of a format example of a GN-IP address request/response message to be interchanged between a gateway and an LN-HA shown in FIG. 9;

FIG. 8 is an illustration of a format example of a GN-IP address request/response message to be interchanged between an xSP server and the gateway shown in FIG. 9;

FIG. 13 is an illustration of a format example of a cooperation information registration/response message to be interchanged between a GN-HA and a gateway shown in FIG. 16;

FIG. 14 is an illustration of a format example of a cooperation information registration/response message to be interchanged between the gateway and an LN-HA shown in FIG. 16;

FIG. 15 is an illustration of a format example of a cooperation information retrieval/response message to be interchanged between an xSP server and the LN-HA shown in FIG. 16;

FIG. 20 is an illustration of a format example of an appliance (LN) cooperation information registration/response message to be interchanged between the LN-HA and a GN shown in FIG. 18;

FIG. 22 is an illustration of a format example of an appliance (LN) cooperation information cancellation/response message to be interchanged between the LN-HA and the GN shown in FIG. 18;

FIG. 24 is an illustration of a format example of an appliance (LN) control/response message to be interchanged between the LN-HA and an appliance controller shown in FIG. 18;

FIG. 29(A) is an illustration useful for explaining a cooperation information deletion operation on the cooperation information table shown in FIG. 28(A);

FIG. 29(B) is an illustration useful for explaining a cooperation information deletion operation on the cooperation information table shown in FIG. 28(B);

FIG. 29(C) is an illustration of the contents of the correspondence table, shown in FIG. 28(C), in a cooperation information deletion operation;

FIG. 30 is an illustration useful for explaining a modification of an operation of the network including the DN in the cooperation information managing system shown in FIG. 1;

FIG. 31(A) is an illustration of a parentage of the LN and the DN shown in FIG. 1;

FIGS. 31(B1), 31(B2), 31(C1), 31(C2) and 31(D) are illustrations of examples of table registration contents based on the parentage shown in FIG. 31(A);

FIG. 32 is an illustration of a format example of a cooperation information change notification/response message to be interchanged between an LN-HA and an xSP server shown in FIG. 30;

FIG. 33 is an illustration of a format example of a cooperation information cancellation request/response message to be interchanged between a GN function node and the LN-HA shown in FIG. 30;

FIGS. 34(A) to 34(C) are illustrations useful for explaining an operation of the LN-HA, shown in FIG. 30, at the cooperation information cancellation;

FIG. 35 is an illustration useful for explaining a supplementary description 1 (using a radio LAN) of this embodiment;

FIG. 36 is an illustration useful for explaining a supplementary description 2 (using a radio LAN) of this embodiment;

DESCRIPTION OF THE PREFERRED EMBODIMENTS

[A] Outline

Figure 1:
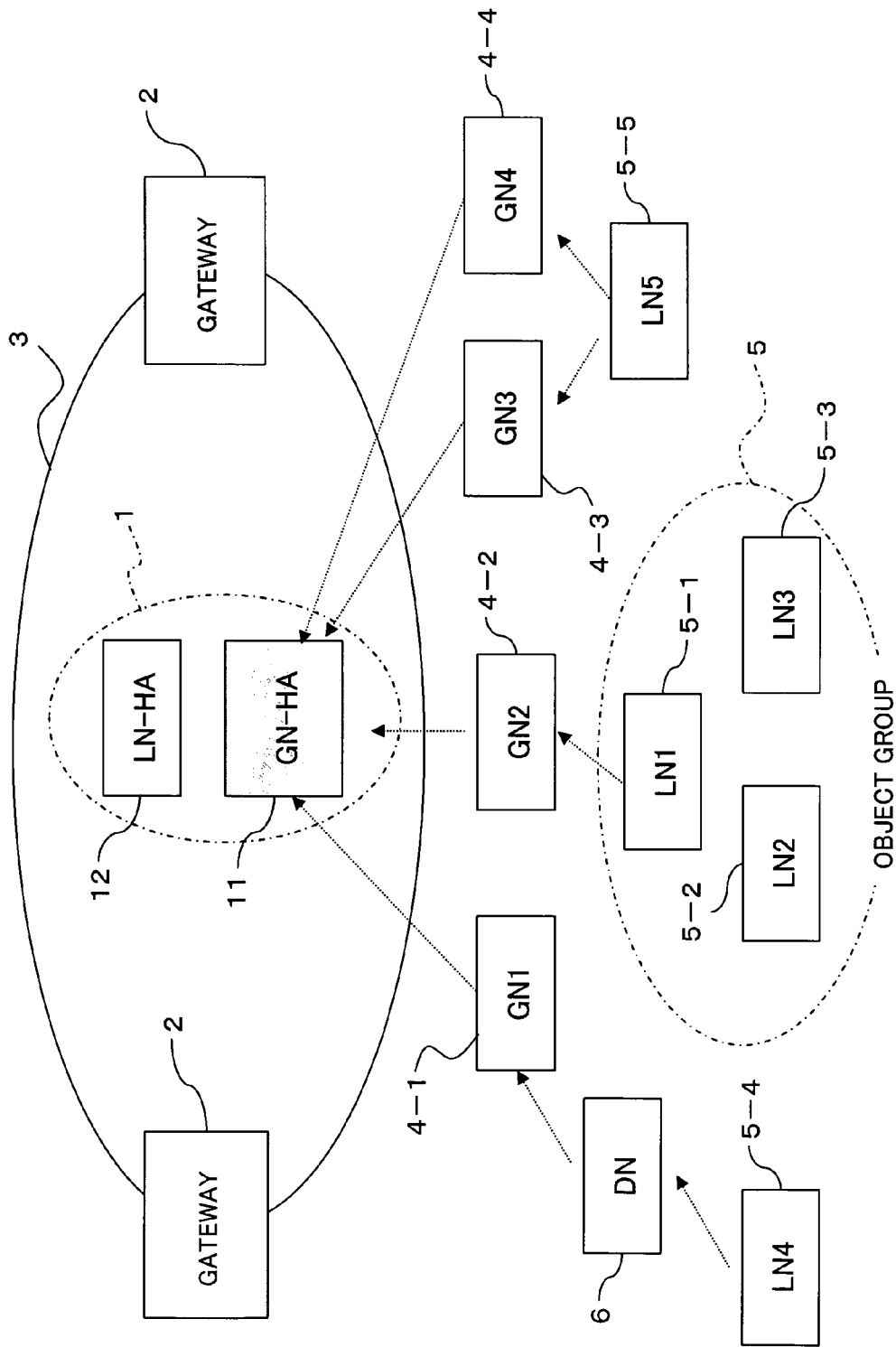
FIG. 1 is a block diagram showing a configuration of a cooperation information managing system according to an embodiment of the present invention.

The present invention is a technique relating to the invention of the previous application (International Application No: JP03/02498). This previous application has proposed one method of realizing a "context aware" service such as transferring the contents (advertisement information or the like) to a service user having an association (cooperation information) with a specific object (satisfying a given context) on the basis of an attribute of an object (article, electric product or the like to which an RF-ID tag is attached) scattered in the real world, an attribute of location (tag attribute showing a characteristic of that position, for example, "conference room" or the like). However, this involves the following examination items.

(1) In a case in which a network becomes large in scale, along with this, it admits of the examination about a facility of efficiently conducting operations such as registration, renewal and deletion at a high speed (ensuring the scalability).

(2) Although in the previous application it is expected that the relation of an appliance and a user using this appliance is one to one, if the service becomes complicated, the relation between the appliance and the user using this appliance is not always one to one. For example, the one-to-many relation can take place in the case of the shared use of a printer or the like. Therefore, there is a need to use a cooperation information managing facility coping with such cases.

(3) Although in the previous application the reception of the contents or the like based on the attribute of an object is feasible in the GN (Global Node), the examination on a case in which restrictions are imposed on performance, mounted application, contents reception interface and others in the GN is insufficient. In particular, for example, in a case in which a server or the like for the transmission of contents cannot seize the performance (memory capacity, CPU speed, interface speed, and others) of the node receiving the contents, there is a possibility that the contents receiving performance falls short. Therefore, also in such a case, there is a need to enable the appropriate contents reception.

(4) In the previous application, in a case in which communication is made through a network of a different carrier, since a network of one carrier directly provides cooperation information on a user having a specific IP address to a node of a network of a different carrier, the protection on the location privacy based on the tag information on the user and the concealment of a "thing" the user retains is insufficient. Therefore, there is a need to employ a facility capable of sufficiently achieving the protection of the privacy information on the user.

The present invention has been developed in consideration of these examination items, and is for improving/sophisticating the cooperation managing facility (device) on an object (LN) proposed in the previous application to realize the following.

(1) The configuration of a network under management considering the scalability of objects and reduction in operation cost.

(2) An extended cooperation information managing facility enabling a plurality of users to share (multi-use cooperation) a single appliance.

(3) Through the transfer of a GN function between nodes, the removal of restrictions and the like on the performance of a node functioning as GN.

(4) A facility for protecting the privacy on cooperation information at the communications between different types of carrier networks.

For realizing these, the present invention carries out the following:

(a) the management of object groups by grouping/hierarchizing cooperation information;

(b) the management of appliances available at the same time and the present number of users;

(c) the switching of a node temporarily functioning as a GN by introducing a node (DN: Global-Local Dual function Node) functioning as both GN and LN; and (d) the concealment of privacy information (terminal address and others) by introducing a gateway apparatus.

The present invention can realize a communication platform which can cope scalably and flexibly with the management of object groups and the movement of a network terminal function.

[B] Description Embodiment

An embodiment of the present invention will be described hereinbelow with reference to the drawings.

FIG. 1 is a block diagram showing a configuration of a cooperation information managing system according to an embodiment of the present invention. The cooperation information managing system shown in the illustration is made up of a GN-HA 11 and an LN-HA 12 constituting a cooperation managing facility (cooperation information managing apparatus) 1 provided in a network 3 such as IP network or WAN (Wide Area Network), a gateway apparatus (which will hereinafter be referred to simply as "gateway") 2, GNs (in this case, four GNs) 4-1 to 4-4 capable of making communications through the cooperation managing facility 1 (GN-HA 11) and the network 3, LNS 5-1 to 5-5 capable of making communications with the GNs 4-$i$ ($i$=1 to 4), and a DN 6. FIG. 1 shows that the LNs 5-1, 5-2 and 5-3 constitute a single object group 5 while the LN 5-4 makes communication with the DN 6 combining the function of the LN and the function of the GN and the DN 6 is capable of making communication with the GN 4-1 and the LN 5-5 is capable of making communication with each of the GNs 4-3 and 4-4.

In this case, each of the LNs (first units) 5-$j$ ($j$=1 to 5) is a device such as an RF-ID tag including an individual identification information storing unit 51 (which will be mentioned later with reference to FIG. 3) made to store its own individual identification information [LN-ID (first identifier)] such as type of function or manufacturing number, and makes communication through a radio interface or the like with the GN 4-$i$ (or the DN 6) to transmit its own LN-ID to the GN 4-$i$ (or the DN 6).

This LN 5-$j$ includes, for example, a public appliance (device located at a highly public place and usable by the unspecified number of people under given permission), a lending type (popular name: Kiosk) terminal, and others. Moreover, the communication between these LN 5-$j$ and GN 4-$i$ can be one-way communication, for example, from an RF-ID tag (corresponding to an LN) to an RF-ID reader (corresponding to a GN), or it can be two-way communications using a bluetooth or the like.

Each of the GNs 4-$i$ (second units) is a device such as a radio tag reader for reading the LN 5-$j$, and has a communication function with the network 3 and is connected through wireless or wire means to the cooperation managing facility (GN-HA 11) to be communicable therewith to register the cooperation information between the LN 5-$j$ and the GN 4-$i$ in the cooperation managing facility 1 (GN-HA 11).

The DN (third unit) 6 is a device combining the function of the LN 5-$j$ and the function of the GN 4-$i$, that is, having a function to, in a case in which it functions as the GN, make communication with the LN 5-$j$ for reading out the LN-ID thereof and transmitting the LN-ID, together with its own GN-ID (it retains), as the cooperation information to the GN-HA 12 and to, in a case in which it functions as the LN, make communication with the GN 4-$i$ for transmitting, as the LN-ID to be read out by the GN 4-$i$, its own LN-ID to the GN 4-$i$.

(B1) Description of Function of GN

For example, as shown in FIG. 2, the GN 4-$i$ is composed of a local network interface 41, an LN information collecting unit (RF-ID reader or the like) 42, an LN information extracting unit 43, an GN individual identification information storing unit 44, a global (broad) position registration function unit 45 and a global network interface 46.

The local network interface 41 is an interface made to make communication through a radio interface (not shown) or the like with the LN 5-$j$, and the LN information collecting unit 42 is for collecting the information (message) received from the LN 5-$j$. Moreover, the LN information extracting unit 43 is for extracting the identification information (LN-ID) peculiar to the LN 5-$j$ from the information collected by the LN information collecting unit 43.

The GN individual identification information storing unit (memory) 44 is for storing the identification information [second identifier (GN-ID)] peculiar to the GN 4-$i$. For example, as this GN-ID, there is employed information such as an IP address which can identify the GN 4-$i$ uniquely in a network.

The global position registration function unit (position control protocol stack) 45 is for transmitting, as the cooperation information, a combination of the GN-ID stored in the GN individual identification information storing unit 44 and the LN-ID extracted by the LN information extracting unit 43 through the global network interface 46 and an IP interface (not shown) or the like to the GN-HA 11. In general, the "protocol stack" signifies a software group in which protocols needed for realizing a specified function on a network are selected and stacked in a hierarchical condition.

(B2) Description of Function of LN

On the other hand, for example, as shown in FIG. 3, the LN 5-*j* is composed of an individual identification information storing unit (memory) 51, a read request detecting unit 52, a read request response unit 53 and an information read interface 54.

The individual identification storing 51 is for storing identification information for identifying itself or identification information (LN-ID) for, in the case of an RF-ID tag, identifying an object (appliance) to which itself is attached, and the read request detecting unit 52 is for detecting a read request on the LN-ID from the GN 5-*j* and, when detecting this read request, reads out the LN-ID from the individual identification information storing unit 51 to transfer it to the read request response unit 53.

The read request response unit 53 is for transmitting the LN-ID transferred from the read request detecting unit 52, as a response to the aforesaid read request, through the information read interface 54 to the GN 4-*i* on the requesting side. The information read interface 54 has a function to receive the read request and to transmit the response (LN-ID).

(B3) Description of Function of GN-HA

Furthermore, for example, as shown in FIG. 4, the aforesaid GN-HA 11 is composed of an access side network interface 111, a cooperation information extracting unit 112, a global position registration function unit (position control protocol stack) 113, a GN position (cooperation) information database (DB) 114, an LN-HA cooperation function unit 115 and a core side network interface 116.

The access side network interface 111 is a communication interface with respect to the GN 4-*i*, and has the LN-ID read request transmission function and the response reception function thereto, and the cooperation information extracting unit 112 is for extracting the cooperation information (the association between LN-ID and GN-ID) from the response to the aforesaid read request received through the interface 111. Moreover, the global position registration function unit 113 stores the cooperation information extracted by the LN information extracting unit 112 in the GN cooperation information DB (storing unit) 114 and has a function to transfer this cooperation information to the LN-HA cooperation function unit 115 for the transmission to the LN-HA 12. The GN cooperation information DB 114 is realized using a required recording medium such as a RAM and a hard disk. The GN cooperation information DB 114 can be of a built-in type or an external type.

The LN-HA cooperation function unit 115 is for transmitting, as an LN position (cooperation) information message, the cooperation information on the LN-ID and the GN-ID transferred from the aforesaid global position registration function unit 113 through the core side network interface 116 to the LN-HA 12, and the core side network interface 116 is a communication interface with respect to the LN-HA 12.

In the GN-HA 11 thus configured, upon receipt of a response (registration of the cooperation information) from the GN 4-*i*, the cooperation information extracting unit 112 extracts the cooperation information, and the global position registration function unit 113 stores it in the GN cooperation information DB 114. Moreover, the LN-HA cooperation function unit 115 transmits the stored cooperation information on the LN-ID and the GN-ID to the LN-HA 12. Following this, the GN-HA 11 manages the association (cooperation information) between the GN-ID and the LN-ID in the real time to manage the latest cooperation information at all times.

Incidentally, in this embodiment, although not shown, the GN-HA 11 also has a function to route received data (contents data such as advertisement information and others for the user of the GN 4-*i*) to the GN-ID (GN-IP address).

(B4) Description of Function of LN-HA

Figure 5:
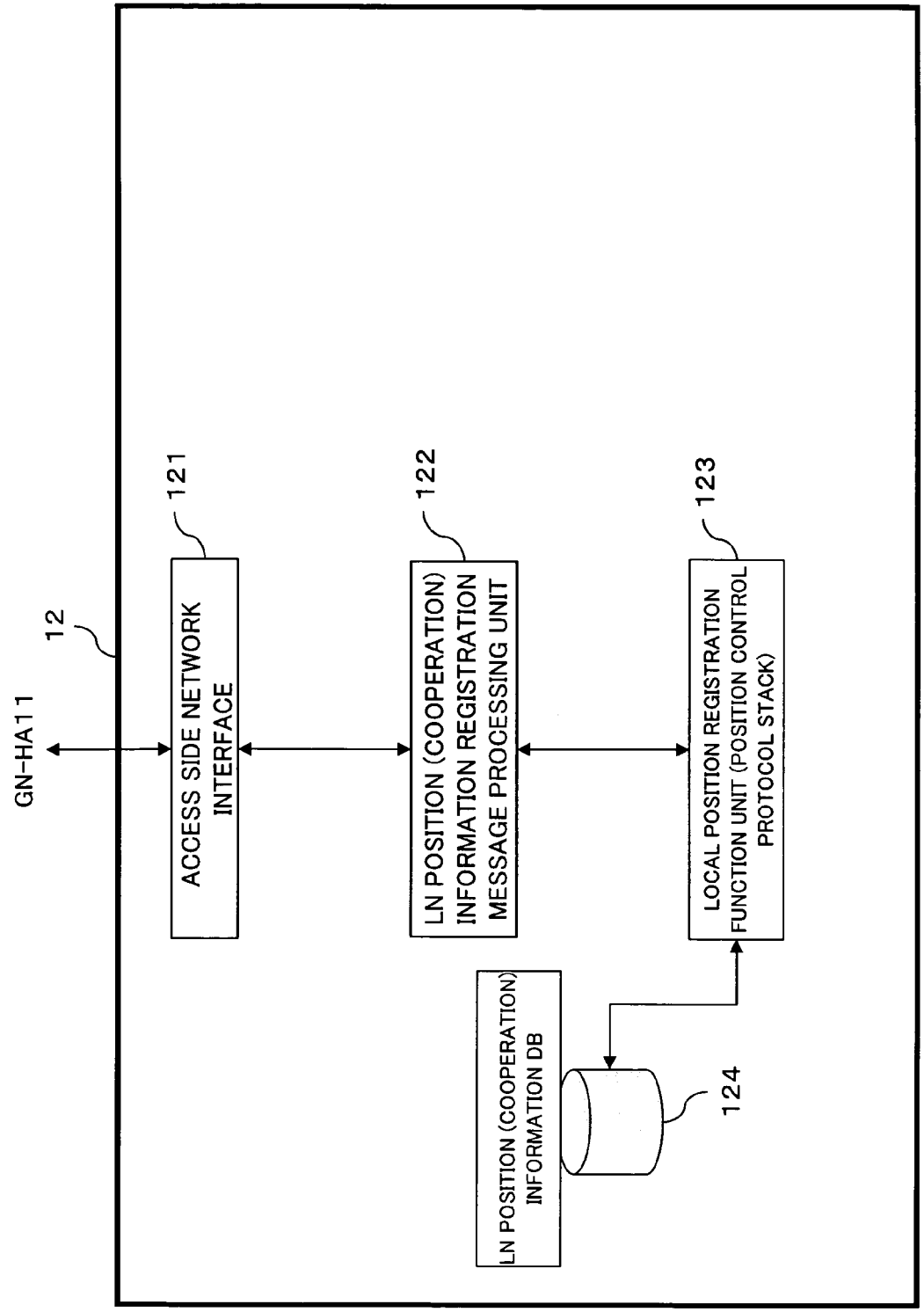
FIG. 5 is a functional block diagram showing a configuration of an LN-HA constituting the cooperation managing facility shown in FIG. 1.

Still furthermore, for example, as shown in FIG. 5, the aforesaid LN-HA 12 is composed of an access side network interface 121, an LN position (cooperation) information registration message processing unit 122, a local position registration function unit (position control protocol stack) 123 and an LN position (cooperation) information database (DB) 124.

The access side network interface 121 is an communication interface with respect to the GN-HA 11 and functions as a means to receiving the aforesaid LN position (cooperation) information message transmitted from the LN-HA cooperation function unit 115 of the GN-HA 11, and the LN position (cooperation) information registration message processing unit 122 has a function to process the LN position (cooperation) information registration message received by the interface 121 (such as analyzing the message contents) for extracting the cooperation information. Moreover, the local position registration function unit 123 has a function to store/put the cooperation information transferred from the LN position (cooperation) information registration message processing unit 122 in the LN position (cooperation) information DB (storing means) 124.

In the LN-HA 12 thus configured, upon receipt of the cooperation information registration message from the GN-HA 11, the LN position (cooperation) information registration message processing unit 122 processes this message, and the global position registration function unit 123 stores the cooperation information in the LN position (cooperation) information DB 124. Following this, the LN-HA 12 manages (registers, renews, deletes) the association (cooperation information) on the LN-ID and the GN-ID in the real time and manages the latest cooperation information at all times. This LN-HA 12 is provided for each object managing carrier.

(B5) Description of Function of Gateway

Secondly, a description will be given hereinbelow of the function of the gateway 2 according to this embodiment.

In the aforesaid cooperation managing system, for example, in a case in which a network of a carrier (for example, a carrier retaining mobile IP terminal subscriber information such as network carrier) which manages the operation of the cooperation managing facility 1 (GN-HA 11) is different from a network of a carrier which distributes contents data such as advertisement information to the GN 4-*i*, if the GN-ID (IP address) is directly used as an ID for the communication between these different carriers, there is a possibility that the relation between an IP address which can be associated with the subscriber information and an object the subscriber cooperates with (uses) leaks out to a different carrier.

For this reason, in this embodiment, the gateway 2 located between the different carrier networks performs the conversion of an ID (GN-ID) to be used for the communication, thereby providing a facility for protecting the subscriber's cooperation information privacy (one kind of personal information whose openness is permitted/inhibited, such as the kind of appliance the subscriber retains or the object in the vicinity of the position of the subscriber).

Figure 9:
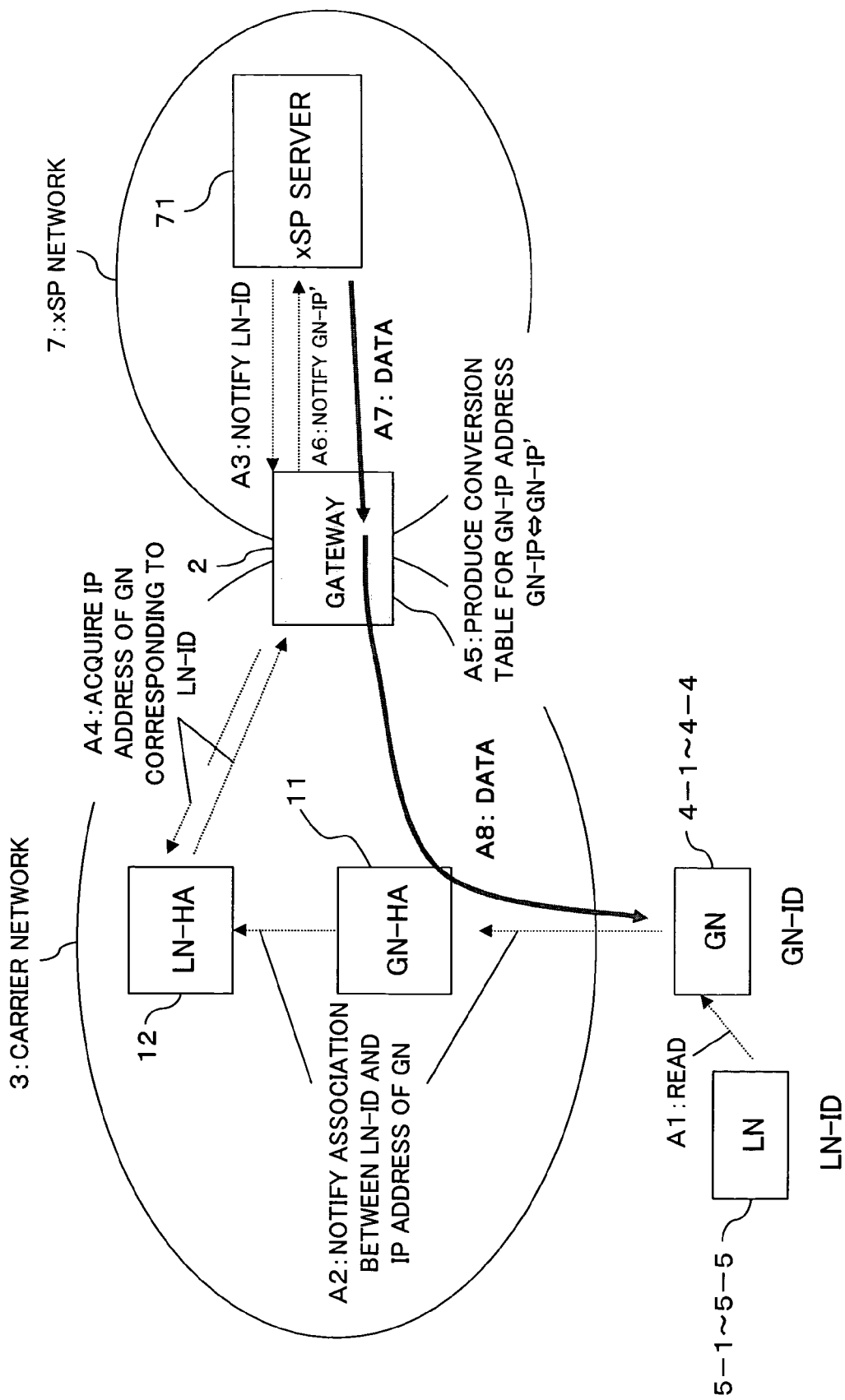
FIG. 9 is an illustration useful for explaining an operation of a network including the gateway of the cooperation information managing system shown in FIG. 1.

(B5.1) In a case in which the GN-HA 11 and the LN-HA 12 lie in a network of the same carrier, let it be assumed that, for example, as shown in FIG. 9, both the GN-HA 11 and LN-HA 12 exist in a network 3 (carrier network) 3 under control of a network carrier such as a type I telecommunications carrier and a gateway 2 exists at the boundary between this carrier network 3 and a network (xSP network) 7 under control of a provider (xSP) different from the carrier, such as ASP (Application Service Provider) or ISP (Internet Service provider), contents data such as advertisement information is distributed from an information providing server (xSP server) 71 on the xSP network 7 operated/managed by the xSP to the GN 4-$i$.

(B5.1.1) Description of Function

Figure 6:
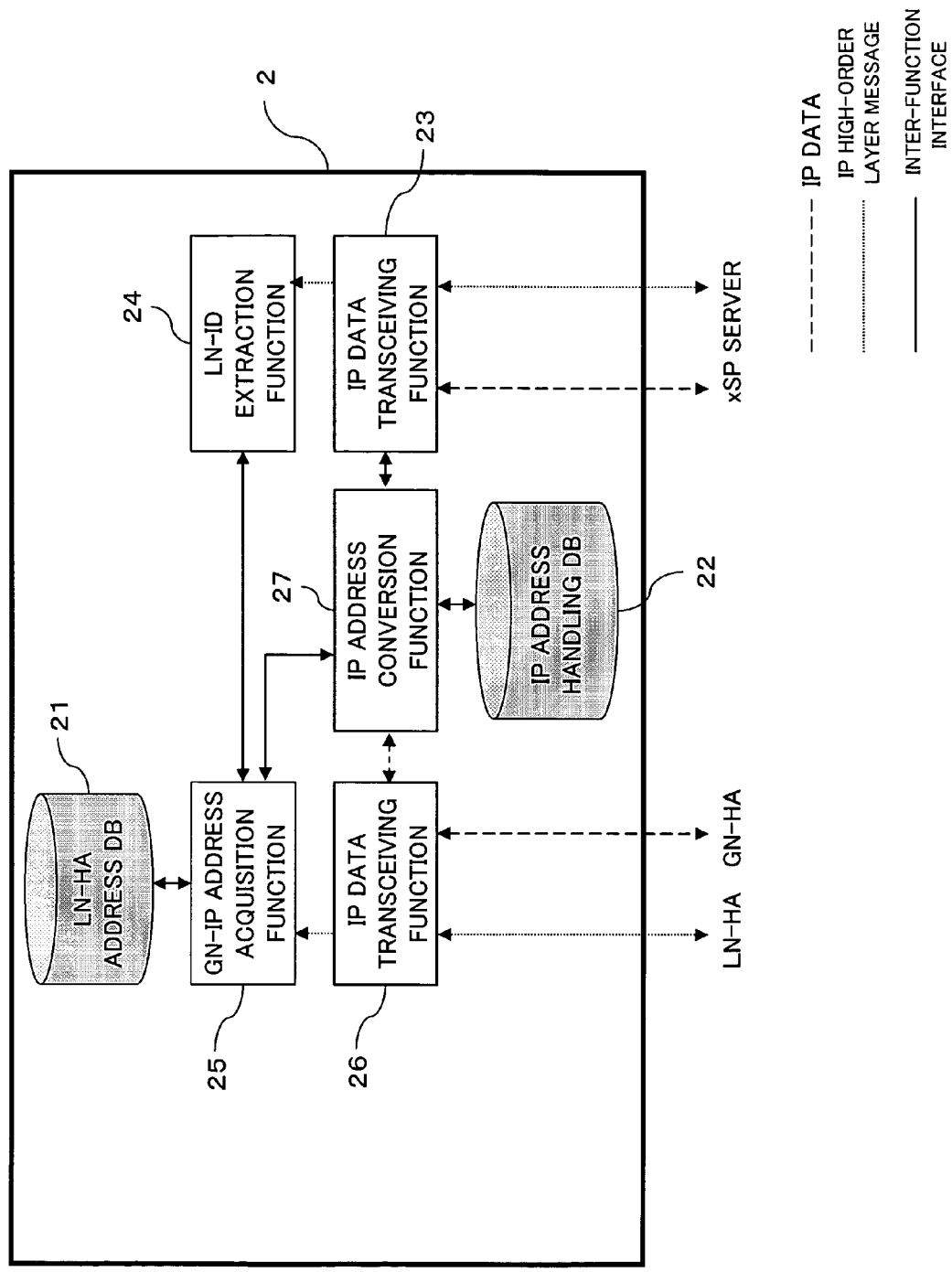
FIG. 6 is a functional block diagram showing a configuration of a gateway shown in FIG. 1.

In this case, for example, as shown in FIG. 6, the gateway 2 is made up of an LN-HA address database (DB) 21, an IP address handling database (DB) 22, IP data transceiving function units 23, 26, an LN-ID extraction function unit 24, a GN-IP address acquisition function unit 25 and an IP address conversion function unit 27.

The LN-HA address DB 21 is for storing an IP address of the LN-HA 12, and the IP address handling DB 22 is for storing a GN-IP address table (conversion table) in which a GN-ID (GN-IP address) to be used on the carrier network 3 side and a converted GN-IP' address to be used on the xSP network 7 side are associated with each other.

The IP data transceiving function unit 23 is a communication interface with respect to the xSP server 71 and has message interfaces of an IP layer and of a layer higher than the IP layer, while the other IP data transceiving function unit 26 is a communication interface between the GN-HA 11 and the LN-HA 12 and has a message interface of a layer higher than the IP layer with respect to the LN-HA 12 and a message interface of the IP layer with respect to the GN-HA 11. Incidentally, as the message interface of the layer higher than the IP layer, there are an Web interface according to SOAP (Simple Object Access Protocol) communications, and others.

For example, when the xSP server 71 makes an inquiry about the GN-ID by a GN-IP address request message (see item no. 1 in FIG. 8) through the use of the LN-ID for distributing contents data such as advertisement information according to the LN 5-$j$ to the corresponding GN 4-$i$, the LN-ID extraction function unit 24 extracts the LN-ID included in this message, and the GN-IP address acquisition function unit 25 has a function to see the LN-HA address DB 21 for acquiring the GN-ID corresponding to the LN-ID extracted by the LN-ID extraction function unit 24, thereby producing a GN-IP address request message (see item no. 1 in FIG. 7) addressed to the appropriate LN-HA 12, and further has a function to extract a GN-IP address included in a GN-IP address response message (see item no. 2 in FIG. 7) forming a response to this message.

The IP address conversion function unit (identifier converting means) 27 combines (1) a storage control function for storing, as the aforesaid conversion table, the GN-IP address acquired from the LN-HA 12 by the afore said GN-IP address acquisition function unit 27 and corresponding to the LN-ID notified from the xSP server 71 and a GN-IP' address obtained by the conversion of this GN-IP address in the IP address handling DB 22 in a state associated with each other, (2) a notification function for notifying the converted GN-IP' address as a destination address, used at the contents distribution to the GN 4-$i$ corresponding to the LN 5-$j$, to the xSP server 71 through the use of a GN-IP address response message (see item no. 2 in FIG. 8), and (3) a GN-IP address conversion function for converting the destination address (GN-IP' address) of the contents data (IP data) received from the xSP server 71 into the original (used on the carrier network 3 side) GN-IP address by making reference to the GN-IP address handling DB 22.

Each of the GN-IP address request/response messages to be interchanged between the gateway 2 and the LN-HA 12 and between the gateway 2 and the xSP server 71 is transmitted/received as an IP high-order layer message in the IP data transceiving function units 23 and 26.

The location of the gateway 2, configured in this way, between the carrier network 3 and the xSP network 7 enables realizing the needed contents distribution according to the LN 5-$j$ to the GN 4-$i$ while concealing the GN-IP address (GN-ID) from the xSP, that is, concealing the privacy on the cooperation information managed in the cooperation managing facility 1.

(B5.1.2) Description of Operation

Figure 10:
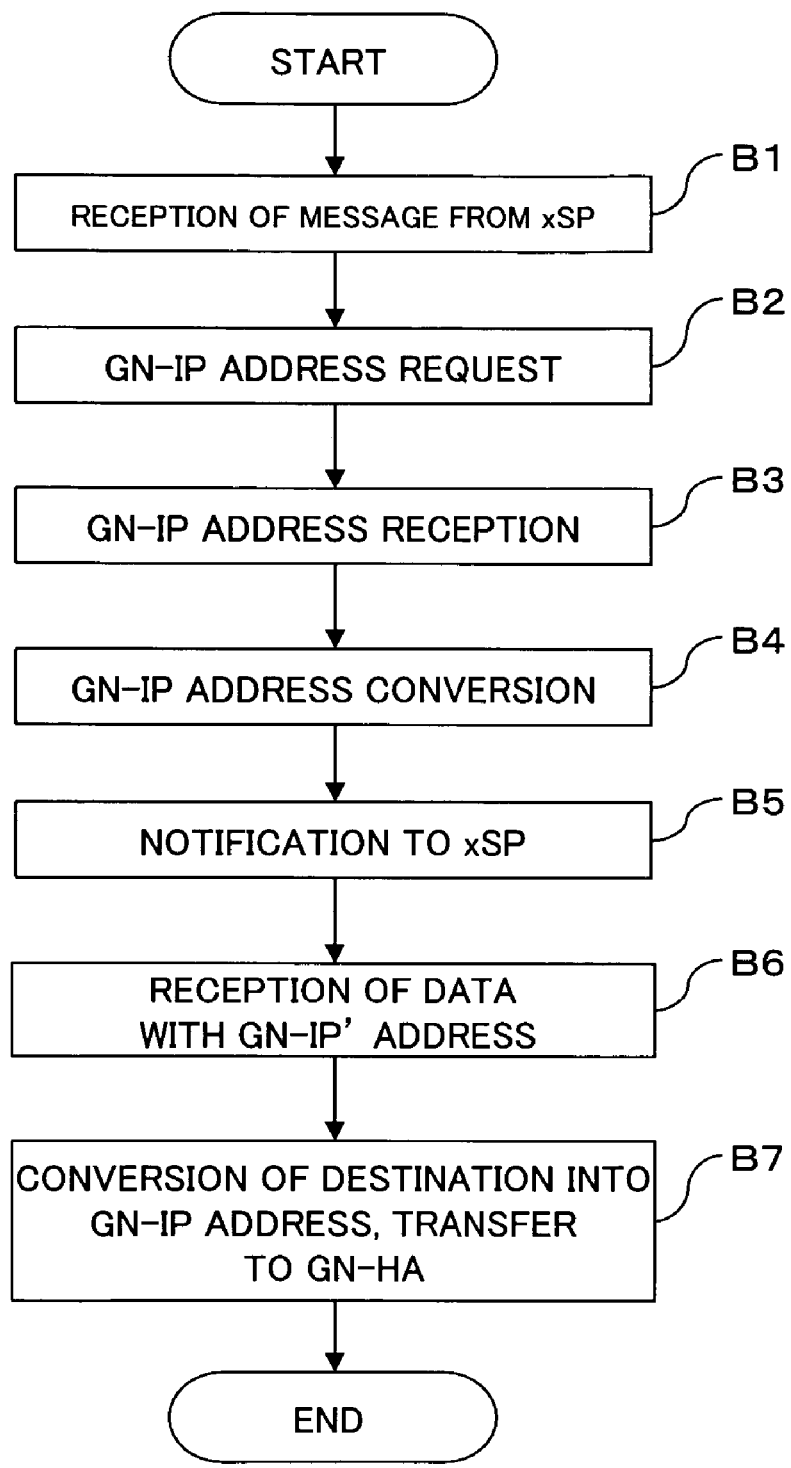
FIG. 10 is a flow chart useful for explaining an operation of the gateway shown in FIGS. 1 and 6.

Referring to FIGS. 9 and 10, a description will be given hereinbelow of an operation of a network including this gateway 2.

First, when the RF-ID of the LN 5-$j$, i.e., the LN-ID, is read by the GN 4-$i$ according to a procedure similar to that of the previous application (step A1 in FIG. 9), the GN 4-$i$ notifies the association (correspondence) between the LN-ID and the GN-ID (GN-IP address) as the cooperation information to the GN-HA 11, and the GN-HA 11 registers (stores) this cooperation information in a GN cooperation information DB 114 (see FIG. 4) by use of the GN-IP address as a key and notifies it to the LN-HA 12. The LN-HA 12 registers (stores) the cooperation information notified from the GN-HA 11 in an LN cooperation information DB 124 (see FIG. 5) by use of the LN-ID as a key (step A2 in FIG. 9).

At this time, the xSP server. 71 starting to provide a service related to the LN 5-$j$ (LN-ID) notifies the LN-ID to the gateway 2 through the use of the GN-IP address request message for acquiring the GN-IP address needed for transmitting the information on the LN 5-$j$ to the GN 4-$i$ which has read the LN-ID of the LN 5-$j$ (step A3 in FIG. 9). Upon receipt of this request message (step B1 in FIG. 10), the gateway 2 acquires the GN-IP address corresponding to the LN-ID included in this message by making an inquiry at the LN-HA 12 by the GN-IP address request message through the GN-IP address acquisition function unit 25 and the IP data transceiving function unit 26 (step A4 in FIG. 9 and steps B2 and B3 in FIG. 10).

In addition, when receiving the GN-ID address from the LN-HA 12 through the IP data transceiving function unit (receiving means) 26, the gateway 2 converts the GN-ID address through the IP address conversion function unit 27 into the GN-IP' address (address for server notification) routed to this gateway 2 (step B4 in FIG. 10) to produce a GN-IP address table (conversion table) (step A5 in FIG. 9) and further to store it in the GN-IP address handling DB 22, and notifies the GN-IP' address corresponding to the GN-IP address acquired from the LN-HA 12 through the IP data transceiving function unit (transmitting means) 23 to the xSP server 71 in the form of a GN-IP address response message (step A6 in FIG. 9 and step B5 in FIG. 10).

Following this, the xSP server 71 transmits IP data with the GN-IP' address notified from the gateway 2 being used as a destination address (step A7 in FIG. 9). Upon receipt of the data (data in which the GN-IP' after the aforesaid conversion is put) to this GN-IP' address (step B6 in FIG. 10), through the use of the IP address conversion function unit 27, the gateway 2 again converts the GN-IP' address to the original GN-IP address (inverse conversion) by seeing the GN-IP address table in the GN-IP address handing DB 22, and transfers it through the IP data transceiving function unit 26 to the GN-HA 11 (step B7 in FIG. 10).

That is, the IP address conversion function unit 27 and the IP data transceiving function unit 26 function as an information transferring means to inverse-convert the converted GN-IP' address from the xSP server 71, put in the IP data, into the GN-IP address before the conversion for transferring to the GN 4-*i* having this address. Therefore, the data addressed to the GN-IP arrives at the GN-HA 11 and routed by the GN-HA 11 to be finally transferred to the GN 4-*i* (step A8 in FIG. 9).

Thus, in this embodiment, the gateway 2 is introduced between the different carrier (provider) networks 3 and 7, and in a case in which one server 71 makes an inquiry at the cooperation managing facility 1 about the cooperation information, i.e., the GN-ID related to the LN-ID, the GN-ID returned in response to this inquiry can be converted into a different ID for the notification to the different carrier, thereby realizing desired data transfer to the GN 4-*i* while concealing (suppressing) the privacy on the cooperation information about the subscriber of its own network from the different provider (xSP).

In particular, in a case in which the GN-HA 11 additionally has a function as a home agent of a mobile IP, since the node to which the GN 4-*i* transmits a route optimizing (shortest route up to a target node) request is not the xSP server 71 but the gateway 2, the gateway 2 at the application of the mobile IP not only functions as a repeating node between the xSP server 71 and the GN-HA 11 but also functions as a route optimizing node in the carrier network 3. Therefore, in the carrier network 3, most of data addressed to the GN 4-*i* is not required to pass through the GN-HA 11, which saves the network resource in the carrier network 3 and considerably reduces the packet transfer load of the GN-HA 11.

In addition, in a case in which a plurality of xSP provider networks 7 are connected to a network 3 of a single network carrier, (1) the fixture of the gateway 2 and (2) the route optimization in the gateway 2 lead to the simplification of the communication platform, and the network carrier, as a principal function, carries out the data transfer in its own network region including the gateway 2 while the xSP, as a principal function, transmits the data to the address converted by the gateway 2. This enables the separation of roles, and the architecture according to this embodiment is extremely effective also in terms of functional dispositions of both the carrier and xSP.

(B5.2) Case in Which GN-HA 11 and LN-HA 12 Lie in Different Networks

Figure 16:
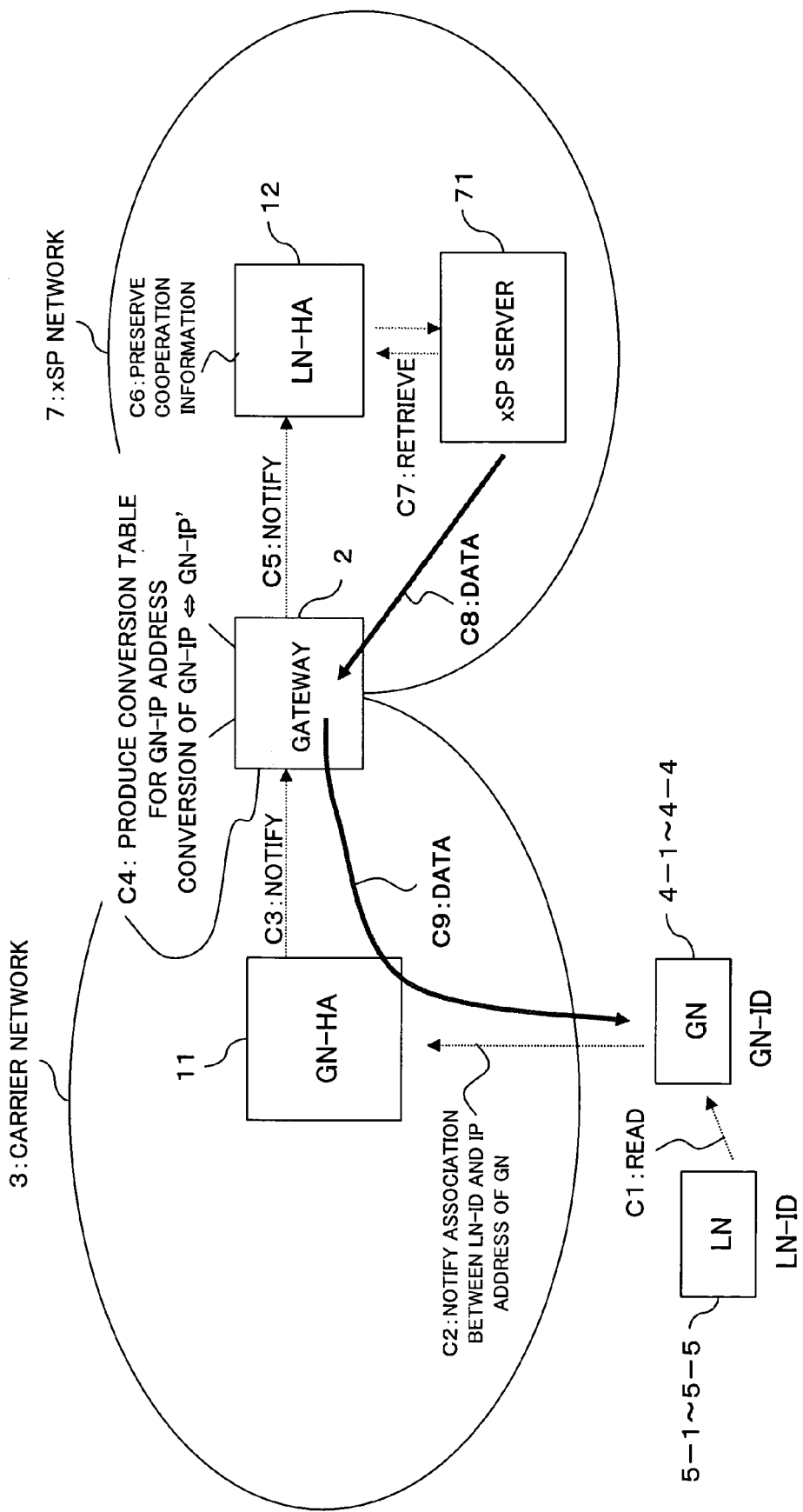
FIG. 16 is an illustration useful for explaining a modification of the operation of the network including the gateway of the cooperation information managing system shown in FIG. 9.

Secondly, as a variation of the system configuration described in the aforesaid item (B5.1), for example, as shown in FIG. 16, let it be assumed that the GN-HA 11 exists in a network (carrier network) 3 under control of a network carrier such as a type I telecommunications carrier and the LN-HA 12 exists in an xSP network 7 under control of a provider (xSP), such as ASP or ISP, different from the carrier, and a gateway 2 is located between these networks 3 and 7. That is, the example shown in FIG. 16 differs from the example shown in FIG. 9 in that the LN-HA 12 pertains to the xSP network 7.

This forms an example of a network configuration in which the LN 5-*j* is not necessarily managed by the same network carrier as that of the GN-HA 11 and the xSP has the LN-HA 12 on its own to realize a service using the LN-ID information (for example, user's ID card or the like) the xSP retains.

(B5.2.1) Description of Function

Figure 11:
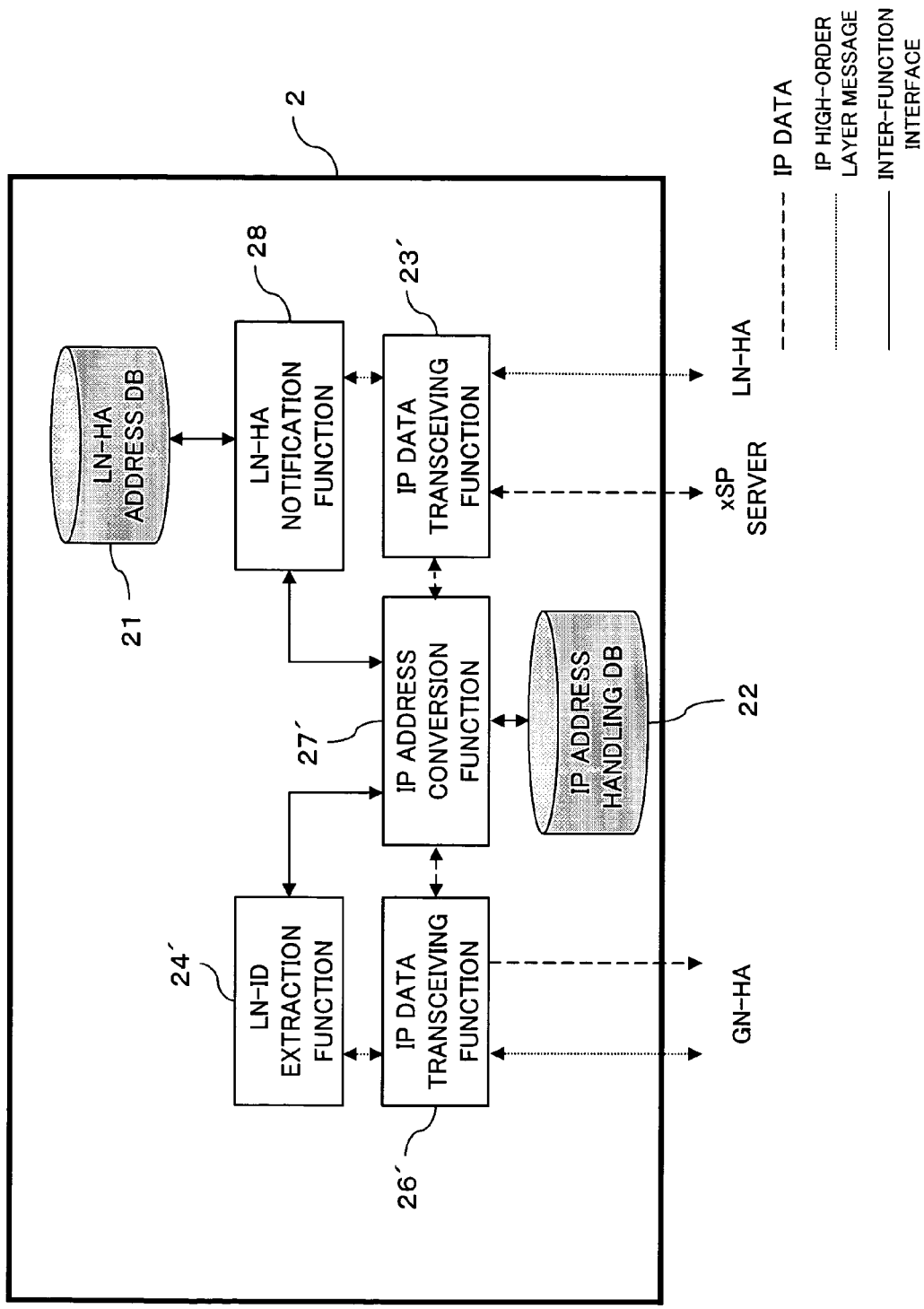
FIG. 11 is a functional block diagram showing a modification of the gateway shown in FIG. 6.

In this case, for example, as shown in FIG. 11, the gateway 2 is equipped with, in addition to the LN-HA address DB 21 and IP address handling DB 22, IP data transceiving function units 23', 26', an LN-ID extraction function 24', an IP address conversion function unit 27' and an LN-HA notification function unit 28.

The IP data transceiving function unit 23' forms a communication interface between the xSP server 71 and the LN-HA 12, and has an IP layer message interface with respect to the xSP server 71 and a message interface higher than the IP layer, while the other IP data transceiving function unit 26' forms a communication interface to the GN-HA 11 and has an IP layer message interface and a message interface higher than the IP layer. Incidentally, also in this example, as the message interface of the layer higher than the IP layer, there are an Web interface according to SOAP (Simple Object Access Protocol) communications, and others.

The LN-ID extraction function unit 24' has a function to extract the LN-ID from the information (LN-ID, GN-IP address, IP address of LN-HA 12) notified from the GN-HA 11 through the use of a cooperation information registration message (see item no. 1 in FIG. 13), and the IP address conversion function unit 27' combines (1) a storage control function to store, as an IP address table (conversion table), the GN-IP address notified from the GN-HA 11 and the GN-IP' address obtained by the conversion of this GN-IP address in the IP address handling DB 22 in a state associated with each other and (2) a conversion function to, with respect to the aforesaid cooperation information registration message including an IP address of the LN-HA 12 (which will hereinafter be referred to an LN-HA address), convert the source IP address from the GN-IP address to be transmitted from the GN-HA 11 as substitute for the GN 4-*i* into the GN-IP' address to be routed by this gateway 2.

The LN-HA notification function unit 28 has a function to make reference to the LN-HA address DB 21, for setting, as the LN-HA address, the destination address of the aforesaid cooperation information registration message in which the GN-IP' address after the conversion by the aforesaid IP address conversion function unit 27' forms the source address and to repeat the aforesaid cooperation information registration message from the GN-HA 11 through the IP data transceiving function unit 23' to the LN-HA 12. The contents of the cooperation information registration message to be repeated with respect to the LN-HA 12 are as shown at the item no. 1 in FIG. 14. The aforesaid cooperation information registration message is also transmitted/received as a message higher than the IP layer.

Figure 12:
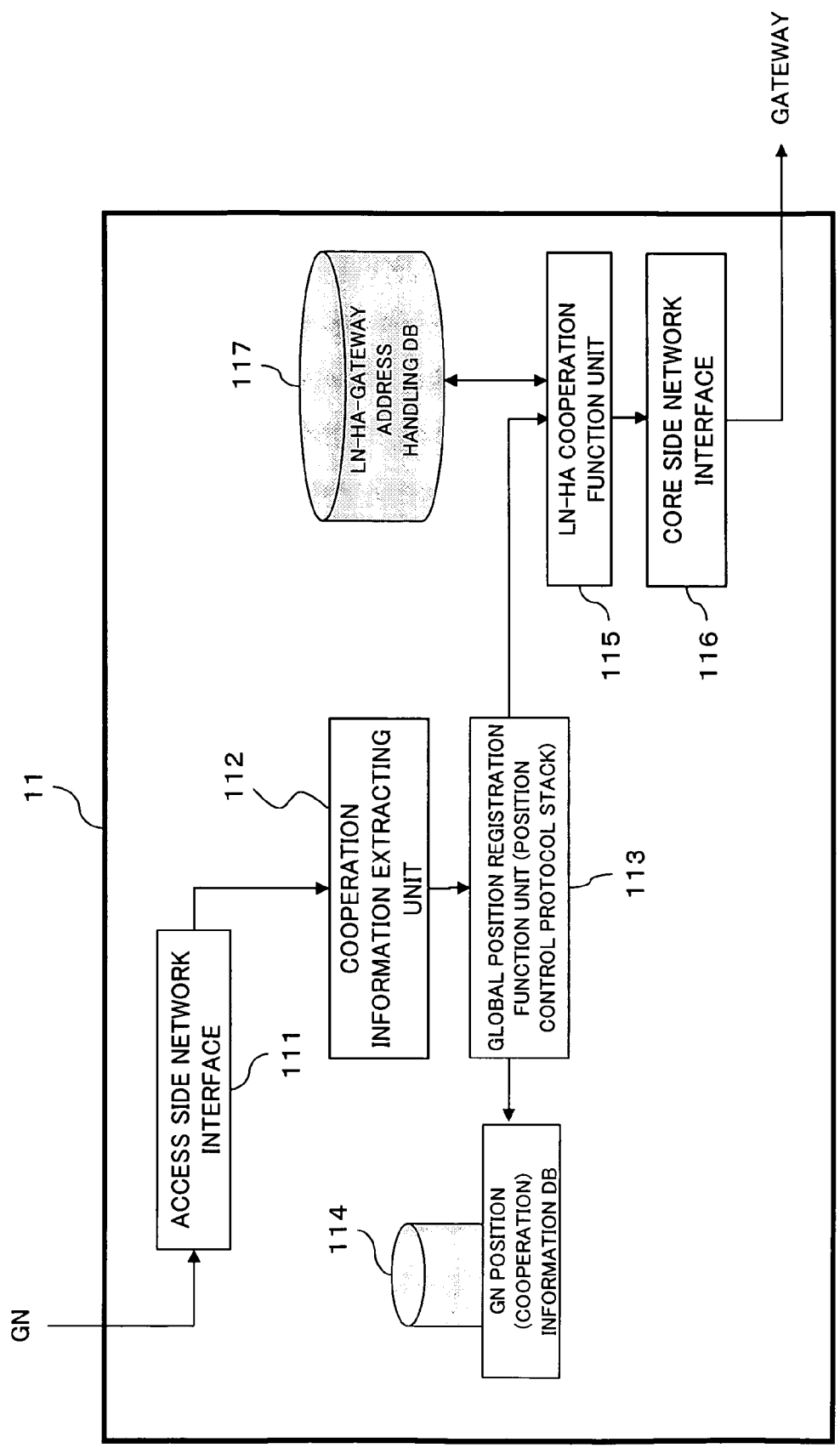
FIG. 12 is a functional block diagram showing a modification of the GN-HA shown in FIG. 4.

Meanwhile, in the case of this example, since there is a need for the GN-HA 11 to specify the gateway 2 corresponding to the LN-HA 12 to which the cooperation information registration message is to be transmitted for transmitting the cooperation information registration message to the gateway 2, an LN-HA-gateway address handling database (DB) 117 is additionally provided as shown in FIG. 12 and, hence, an LN-HA cooperation function unit 115 can transmit the aforesaid cooperation information registration message to that gateway 2 by referring to the DB 117.

Moreover, in the case of this example, each of the gateway 2 and the LN-HA 12 has a response function to return, as a response to the aforesaid cooperation information registration message, a registration processing result (OK or NG) of the cooperation information through the use of a cooperation information response message (see item no. 2 in FIGS. 13 and 14). In the gateway 2, this response function is realizable, for example, as one function of the IP data transceiving function unit 23', 26', and in the LN-HA 12, it is realizable, for example, as one function of an LN position (cooperation) information registration message processing unit 122 (see FIG. 5). The aforesaid cooperation information response message is also transmitted/received as a message of a layer higher than the IP layer.

Still moreover, in the case of this example, when starting to carry out a service on the GN 4-$i$ which reads out the LN-ID of the LN 5-$j$, the xSP server 71 issues a cooperation information retrieval message (see item no. 1 in FIG. 15) to the LN-HA 12 to make a request for the retrieval of the GN-IP' address corresponding to the LN-ID from an LN cooperation information DB 124 of the LN-HA 12 and acquire the retrieval result through a cooperation information response message (see item no. 2 in FIG. 15) to transmit the data to the acquired GN-IP'. The cooperation information retrieval/response message is also transmitted/received as a message higher than the IP layer between the LN-HA 12 and the xSP server 71. Still moreover, in the LN-HA 12, the function of retrieving the GN-IP' address and the function of producing the cooperation information response message as the retrieval result response are realizable, for example, as one function of an LN cooperation information registration message processing unit 122 (see FIG. 5).

(B5.2.2) Description of Function

Figure 17:
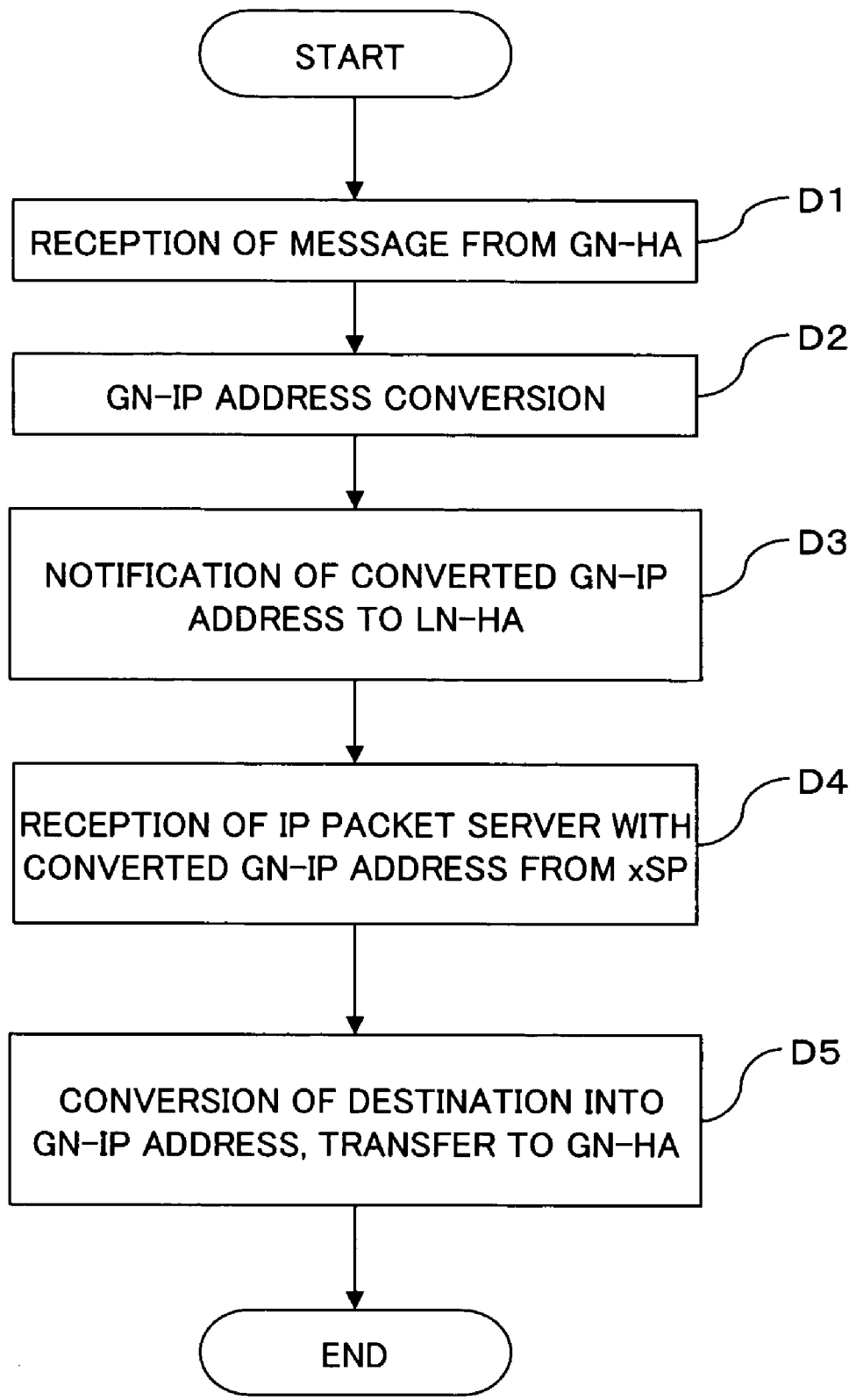
FIG. 17 is a flow chart useful for explaining an operation of a gateway of the modification of the network operation shown in FIG. 16.

Referring to FIGS. 16 and 17, a description will be given hereinbelow of an operation of a network including the gateway 2 configured in this way.

First, also in this case, when the GN 4-$i$ reads out the RF-ID of the LN 5-$j$, i.e., the LN-ID (state C1 in FIG. 16), the GN 4-$i$ notifies the association between the LN-ID and the GN-ID (GN-IP address) as the cooperation information to the GN-HA 11 (step C2 in FIG. 16). The GN-HA 11 registers (stores) the notified cooperation information in a GN cooperation information DB 114 (see FIG. 4) with the GN-IP address being used as a key and, by referring to an LN-HA-gateway address handling DB 117, transmits (notifies) the cooperation information to that gateway 2 through the use of the aforesaid cooperation information registration message (see item no. 1 in FIG. 13; its own GN-IP address is set as the source address) for the notification to the LN-HA 12 (step C3 in FIG. 16).

In the gateway 2, upon receipt of this cooperation information message (step D1 in FIG. 17), the IP address conversion function unit 27' produces the GN-IP' address for routing to that gateway 2 as the IP address corresponding to the message source address (GN-IP address) for making out an address table (conversion table), and converts the GN-IP address into this GN-IP' address (step C4 in FIG. 16 and step D2 in FIG. 17).

Following this, by seeing the LN-HA address DB 21, the gateway 2 sets, at the LN-HA address, the destination of the cooperation information registration message received at its own address and repeats the received cooperation information registration message (see item no. 1 in FIG. 14) to the LN-HA 12 (step C5 in FIG. 16 and step D3 in FIG. 17). In this case, although in this embodiment the GN-HA 11 stores all the IP addresses of the LN-HA 12, with respect to the step C5 in FIG. 16, for example, in a case in which a SOAP interface or the like is available between the gateway 2 and the LN-HA 12, the address to be stored in the LN-HA 12 can also be an Web communication interface of the LN-HA 12, i.e., a URL (Uniform Resource Locator).

Lastly, upon receipt of the aforesaid cooperation information registration message, the LN-HA 12 puts, in its own cooperation information DB 124, the cooperation information on the LN-ID notified by this message and the GN-IP' address (step C6 in FIG. 16). In response to the start of a service for the GN 4-$i$ which reads out the LN-ID, the xSP server 71 issues the aforesaid cooperation in formation retrieval message (see item no. 1 in FIG. 15), and upon receipt of this message, the LN-HA 12 sees its own cooperation information DB 124 to retrieve/acquire the GN-IP' address corresponding to that LN-ID for returning this GN-IP' address as the retrieval result to the xSP server 71 through the use of a cooperation information response message (see item no. 2 in FIG. 15) (step C7 in FIG. 16).

The xSP server 71 transmits the data to the GN-IP' address acquired from the LN-HA 12 in this way (step C8 in FIG. 16). The gateway 2 receives the transmitted data (step D4 in FIG. 17) and carries out the address conversion of the destination address from the GN-IP' address to the GN-IP address to route it to the GN-HA 11 (step D5 in FIG. 17), and it finally arrives at the GN 4-$i$ under control of this GN-HA 11 (step C9 in FIG. 16).

In this way, at the transmission of contents such as advertisement information or emergency message from the xSP server 71 to the GN 4-$i$ cooperated with a specific LN-ID, the provider such as xSP which manages the LN-HA 11 acquires the converted GN-IP' address corresponding to that LN-ID from the cooperation information DB 124 of the LN-HA 11 and transmits the contents, the emergency message or the like to the this GN-IP' address.

As described above, in a network mode in which different providers manage the GN-HA 11 and the LN-HA 12, respectively, the ID conversion is made on the GN-ID the GN-HA 11 notifies to the LN-HA 12. Therefore, in particular, in a case in which the different provider (xSP) want to conceal the detailed contents or attribute of the LN-ID (LN 5-$j$) from the network carrier, this architecture is useful (because the xSP can retain the LN-HA 11, a unique LN-ID database and others).

Incidentally, in a case in which the contents of the cooperation information DB 124 of the LN-HA 11 vary in the middle of the communication (streaming contents transmission) of the xSP server 71, the LN-HA 11 can properly notify the varied GN-IP' address of the GN 4-$i$ to the xSP server 71.

[B6] Description of Object Sharing Facility

Figure 18:
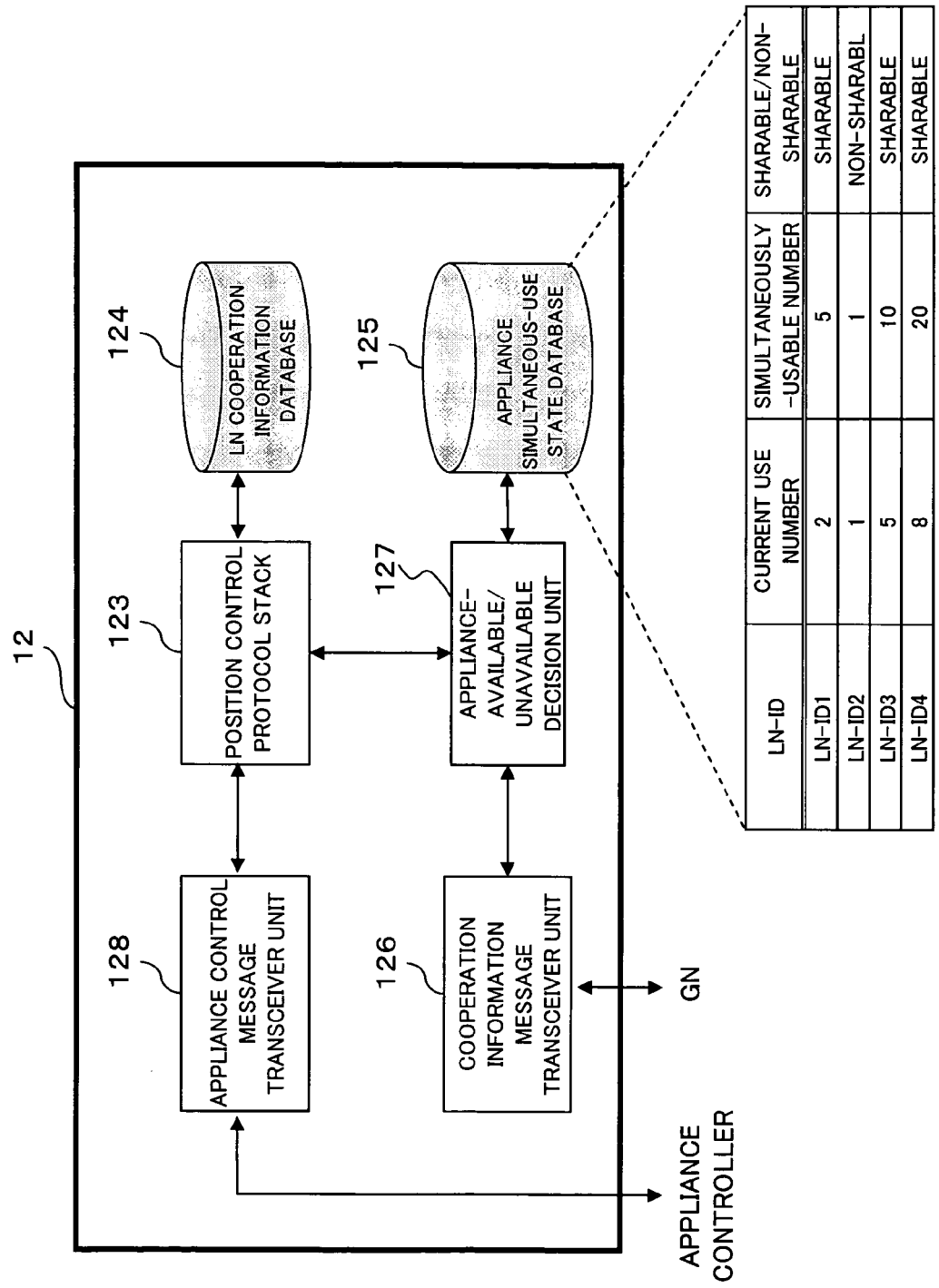
FIG. 18 is a functional block diagram showing a configuration focusing on an object sharing facility of the LN-HA shown in FIG. 1.

Furthermore, a description will be given hereinbelow of an example of disposition of an object sharing facility in the LN-HA 12. FIG. 18 is a functional block diagram showing a configuration focusing on an object sharing facility of the LN-HA 12. As FIG. 18 shows, this LN-HA 12 is equipped with, in addition to the above-mentioned position control protocol stack 123 and LN cooperation information DB 124 (see FIG. 5), for example, an appliance simultaneous-use state database (DB) 125, a cooperation information message transceiving unit 126, an appliance-available/unavailable decision unit 127 and an appliance control message transceiving unit 128.

The appliance simultaneous-use state DB (shared number retaining means) 125 is for retaining information on the number of GNs ("current use number") using the LN 5-$j$ for each appliance (object) not having an IP address, i.e., for each LN 5-$j$, an upper limit value of the number of GNs which can share the LN 5-$j$ and a use state such as sharable/non-sharable, and the cooperation information message transceiving unit 126 is for transceiving a cooperation information message to/from the GN 4-$i$ (receiving an appliance (LN) cooperation information registration/cancellation message from the GN 4-$i$ and transmitting a response message to the GN 4-$i$; which will be mentioned later).

When the cooperation information message transceiving unit 126 receives an LN cooperation information registration message (see item no. 1 in FIG. 20), the appliance-available/unavailable decision unit 127 makes reference to the appliance simultaneous-use state DB 125 to make a decision on whether that LN 5-*j* is available or unavailable. Concretely, if the "current use number" is below the "upper limit value", the decision is made as "available", and if the "current use number" is equal to the "upper limit value", the decision is made as "unavailable". Moreover, when cooperation information message transceiving unit 126 receives an LN cooperation information cancellation message (see item no. 1 in FIG. 22), it decrements the "current use number" of the LN 5-*j* in the appliance simultaneous-use state DB 125, and makes a request to the position control protocol stack 123 for the deletion of the cooperation information entry of this LN 5-*j* and the issue of an appliance control termination signal (power-OFF, or the like).

Accordingly, when the decision result in the appliance-available/unavailable decision unit 127 shows "available", the position control protocol stack 123 according to this embodiment registers the received cooperation information in the LN cooperation information DB 124 and then produces a control signal (LN control message; for example, power-ON signal, or the like), and further returns a processing result (OK) to the GN 4-*i*, which has conducted the registration on the LN 5-*j*, through the use of an LN cooperation information registration response message (see item no. 2 in FIG. 20). On the other hand, if the decision therein shows "unavailable", it returns "LN unavailable NG (in use)" to the GN 4-*i*, which has conducted the registration on the LN 5-*j*, through the use of an LN cooperation information response message (see item no. 2 in FIG. 20) without registering the cooperation information. Moreover, if receiving a request for the deletion of the cooperation information entry and a request for the issue of an appliance control termination signal from the appliance-available/unavailable decision unit 127, it deletes that cooperation information entry in the LN cooperation information DB 124 and issues an LN cooperation information cancellation response message (see item no. 2 in FIG. 22) indicative of the processing result (OK, or the like), and issues an appliance control termination signal to the cancellation requesting side GN 4-*i*.

That is, in this case, upon receipt of the cooperation information from the GN 4-*i*, the position control protocol stack 123 functions as a sharing control means to control the sharing of the LN 5-*j* by the GNs 4-*i* on the basis of the LN-ID and GN-ID included in this cooperation information and the "current use number" and "upper limit value" thereof in the aforesaid DB 125.

The appliance control message transceiving unit 128 is for transceiving an LN control/response message (see FIG. 24) to/from the LN 5-*j*.

Referring to FIGS. 19, 21, 23 and 25, a description will be given hereinbelow of an operation of the object sharing network by the LN-HA 12 configured as mentioned above.

Figure 19:
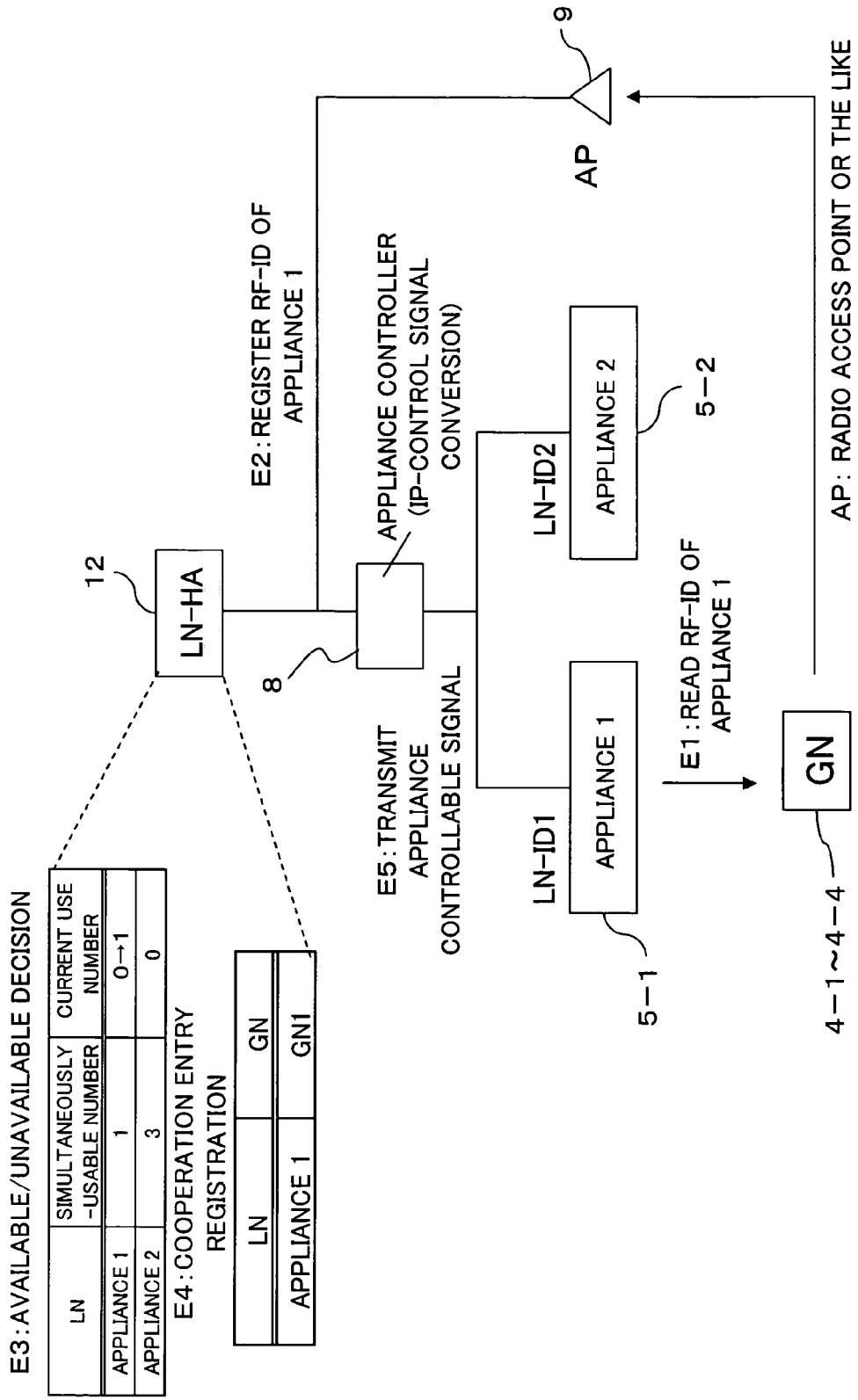
FIG. 19 is an illustration useful for explaining an operation (appliance registration) of an object sharing network including the LN-HA shown in FIG. 18.
Figure 25:
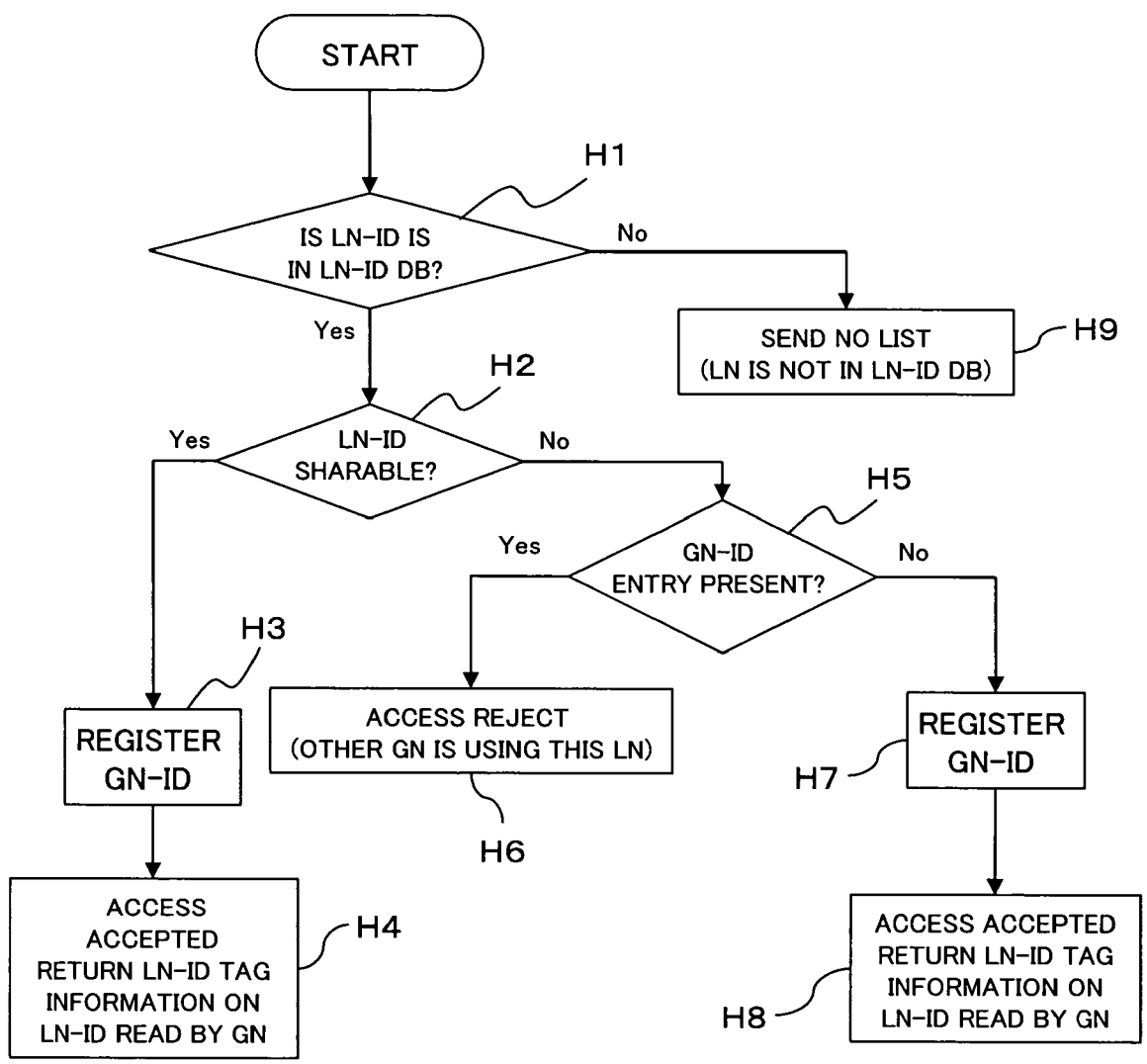
FIG. 25 is a flow chart useful for explaining an operation (at an unavailable condition of an appliance) of the object sharing network including the LN-HA shown in FIG. 18.

(B6.1) At Registration of Appliance (FIGS. 19 and 25)

As FIG. 19 shows, in a network 3, there is provided an appliance controller 8 having an IP/control signal conversion function whereby a control message is interchangeable between an appliance, i.e., a non-IP node such as the LN 5-*j*, and an IP node such as the LN-HA 12. Moreover, for example, when the GN 4-*i* reads out the RF-ID (LN-ID1) of an appliance (LN) 5-1 (step E1), for the registration of the cooperation information on the read LN-ID and its own GN-ID through an access point (AP) 9 or the like in the LN-HA 12, this GN 4-*i* transmits an LN cooperation information registration message including this cooperation information to the LN-HA 12 (step E2).

In the LN-HA 12, upon receipt of this message, the position control protocol stack 123 first confirms whether or not the LN-ID included in this message exists in the LN cooperation information DB 124 (step H1 in FIG. 25). If it exists (the answer in the step H1 indicates "Yes", the appliance-available/unavailable decision unit 127 makes a decision as to whether the appliance is available or unavailable (step E3 and step H2 in FIG. 25). At this time, in FIG. 19, since the "current use number"=0 for the "simultaneously-usable number" of the appliance 5-1=1, the appliance 5-1 is in an "available" state.

Therefore, in the LN-HA 12, the appliance-available/unavailable decision unit 127 increments the "current use number" of the appliance 5-1 (LN-ID1) by one to renew it from 0 to 1, and the position control protocol stack 123 registers the cooperation information, received from the GN 4-*i*, as a new entry in its LN cooperation information DB 124 (step E4, and through Yes route of step H2 to step H3 in FIG. 25) and then returns the LN-ID tag information on the LN-ID, read out by the GN 4-*i*, to the GN 4-*i* (step H4 in FIG. 25), and issues an LN control message (see item no. 1 in FIG. 24) on the appliance 5-1 to the appliance controller 8 (step E5).

Accordingly, the control according to the control contents (power-ON/OFF, play, channel switching, and others) in the aforesaid LN control message is executed on the appliance 5-1 by the appliance controller 8.

In this connection, in a case in which the LN-ID included in the LN cooperation information registration message the LN-HA 12 receives from the GN 4-*i* does not exist in the LN cooperation information DB 124, the LN-HA 12 returns this fact to the GN 4-*i* (through No route of step H1 to step H9 in FIG. 25).

Figure 23:
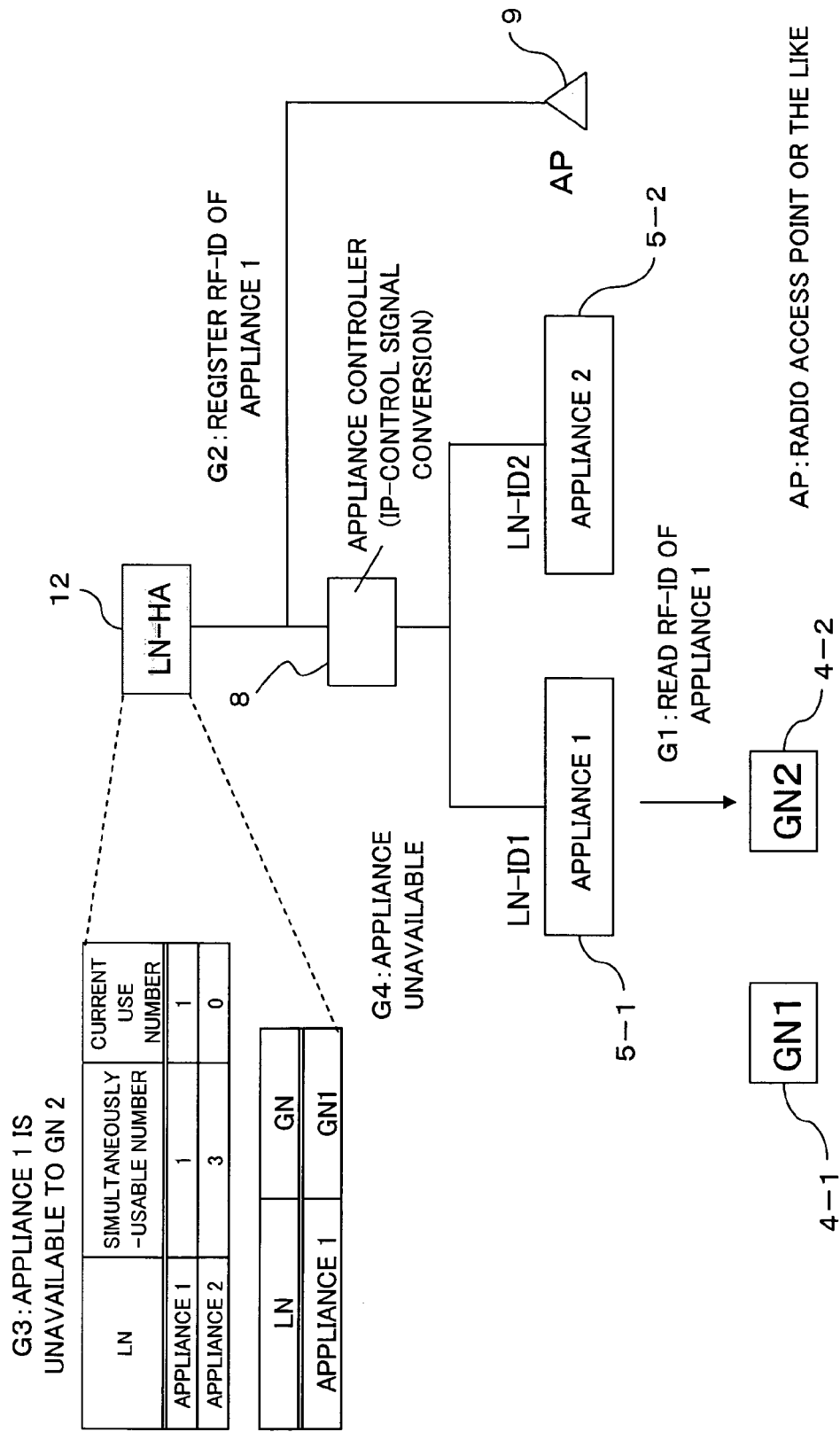
FIG. 23 is an illustration useful for explaining an operation (at an unavailable condition of an appliance) of the object sharing network including the LN-HA shown in FIG. 18.

(B6.2) In Appliance-Unavailable State (FIGS. 23 and 25)

On the other hand, for the aforesaid appliance-available/unavailable decision, for example, as shown in FIG. 23, in a case in which the "current use number" of the appliance 5-1=1 and the further simultaneous use of a new one is unacceptable (No decision in step H2 in FIG. 25), the LN-HA 12 confirms, with respect to the LN-ID1 of the appliance 5-1, whether or not the GN-ID entry exists in the LN cooperation information DB 124 (step H5 in FIG. 25). For example, in a case in which, at the time that a GN 4-2 reads the LN 5-1 to register the cooperation information (steps G1 to G3 in FIG. 23), another GN 4-1 has already read out this LN 5-1 and registered the cooperation information, the cooperation information entry on the LN-ID1 and the GN-ID1 of the GN 4-1 exists in the LN cooperation information DB 124.

Therefore, in this case, the LN-HA 12 notifies the fact of the "NG (in use)" to the GN 4-2, which reads the LN 5-1 after the GN 4-1 conducted it, through the use of the aforesaid LN cooperation information registration response message (see item no. 2 in FIG. 20) (step G4, and through Yes route of step H5 to step H6 in FIG. 25).

In this connection, if the decision in the step H5 shows that the GN-ID entry does not exist therein, the GN-ID of the GN 4-2 which newly reads out the LN 5-1, together with read LN-ID, is newly registered in the LN cooperation information DB 124 of the LN-HA 12, and the LN-ID tag information is returned to this GN 4-2 (through No route of step H5 to steps H7 and H8 in FIG. 25) and the processing result is returned through the use of an LN cooperation information registration response message.

Figure 21:
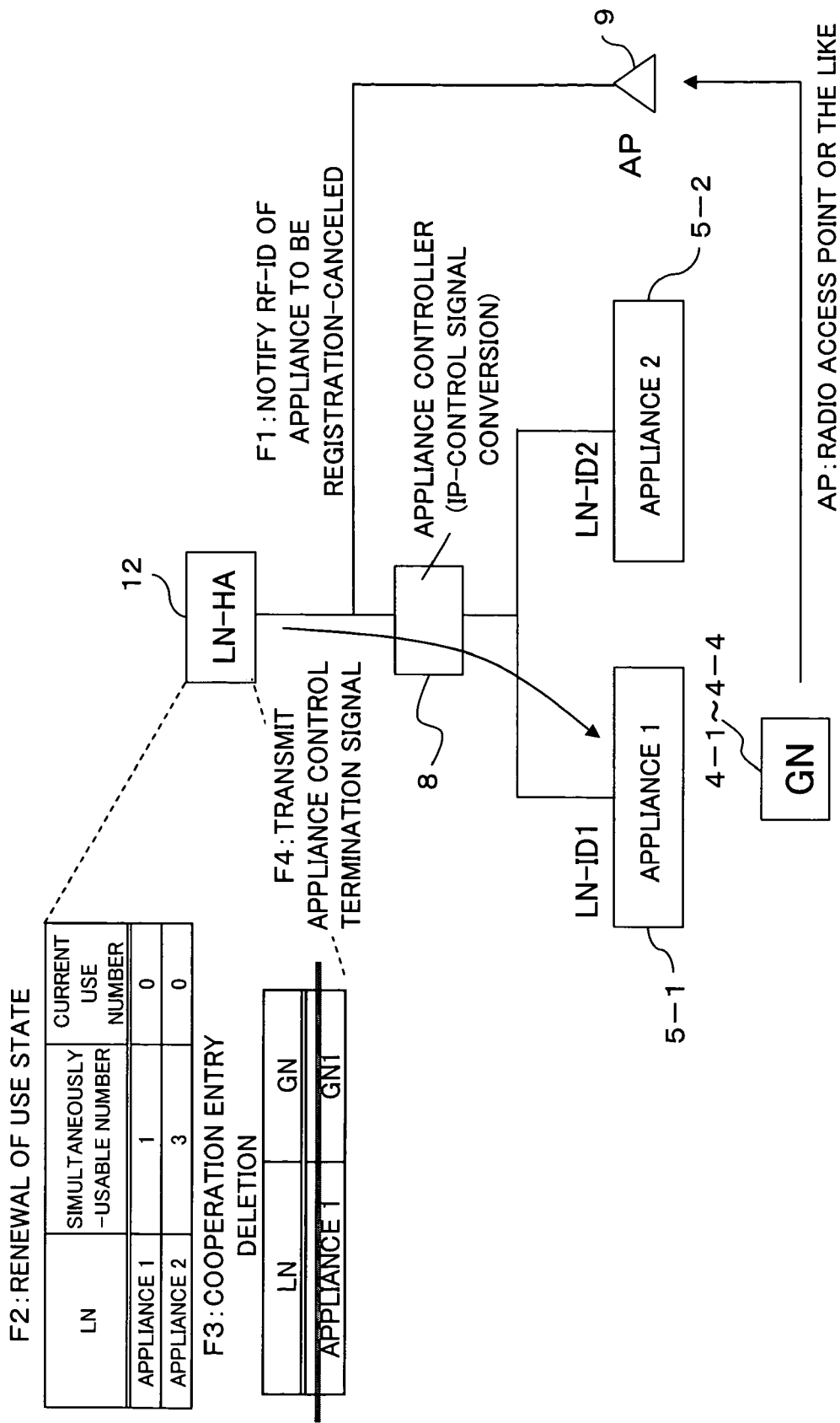
FIG. 21 is an illustration useful for explaining an operation (appliance registration cancellation) of the object sharing network including the LN-HA shown in FIG. 18.

(B6.3) At Cancellation of Registration of Appliance (FIG. 21)

As shown in FIG. 21, for example, when the use of the appliance 5-1 by the GN 4-*i* comes to an end and the appliance 5-1 is removed from the GN 4-*i*, an LN cooperation information cancellation message (see item no. 1 in FIG. 22) is issued from GN 4-*i* through the radio access point 9 or the like to the LN-HA 12 (step F1). Upon receipt of this message, the LN-HA 12 decrements, by one, the "current use number" in the appliance simultaneous-use state DB 125 corresponding to the LN-ID included in this message and deletes the corresponding cooperation information entry in the LN cooperation information DB 124 (steps F2 and F3) and further issues an appliance control termination signal (power-OFF, or the like) to the appliance controller 8 (step F4). Accordingly, the appliance controller 8 can execute the control on the appliance 5-1 according to the contents of the control signal received therefrom to conduct the power-OFF or the like on the appliance 5-1.

Thus, through the use of the LN-HA 12 (cooperation managing facility 1), the appliance 5-*j* can be allocated to the GN 4-*i* according to the use conditions such as the real-time use situation of the appliance 5-*j* and the simultaneously-usable number. Accordingly, in a case in which the appliance 5-*j*, such as a public appliance or a kiosk terminal, is simultaneously used by a plurality of users, the simultaneously-usable number and real-time current use number on that object become manageable, thereby realizing a more practical and operable network architecture.

(B7) Description of Management (Considering User Session) of Objects Grouped

Furthermore, a description will be given hereinbelow of a group managing facility for managing objects (LN 5-*j*) in the LN-HA 12 in a state grouped. This object grouping management enables the object management to have the scalability. In particular, the following description will be given in a case in which the object management is made in the LN-HA 12 for each user session to be recognized by an ID card.

(B7.1) Object Management by Grouping Even Objects (Object Management by Grouping According to User)

A description will be given hereinbelow of an example in which, when the association is made with respect to objects 5-*j* one user retains, a set (combination) of objects 5-*j* associated with each other are collectively managed as a user's session. In the following example, let it be assumed that, as the LN-IDs of the LNs 5-1, 5-2 and 5-3 constituting a single object group 5 (see FIG. 1), the LN-ID1, LN-ID2 and LN-ID3 are already registered as a group (associated group) 1 (group ID=1) (see Table 1) and the GN 4-1 reads the LN 5-1 (LN-ID1). Moreover, in this example, the GN-ID of the GN 4-1 is GN-ID1.

The data (table) shown in the following table 1 can be retained, for example, in the aforesaid LN cooperation information DB 124 (see FIG. 5). In this case, this DB 124 functions as an associated group retaining means to retain an associated group in which the LN-IDs of a plurality of LNs 5-*j* are associated with each other. Naturally, it is also possible that these data are retain in a recording medium such as a dedicated memory different from the LN cooperation information DB 124.

TABLE 1

Association Registration in LN-HA in Initial State

| No. | Group ID or Session ID | LN-ID |
|---|---|---|
| 1 | Group 1 | LN-ID1 |
| 2 | Group 1 | LN-ID2 |
| 3 | Group 1 | LN-ID3 |

(Procedure 1) Session ID Allocation when User Temporarily Retains GN 4-1

(1.1): In a case in which one user uses the GN 4-1, this user makes the GN 4-1 read his/her ID card. The GN 4-1 transmits a registration request, together with the GN-ID1, to the LN-HA 12 for registering the fact that a specific user retains the GN 4-1.

(1.2): Upon receipt of this registration request, the LN-HA 12 regards the aforesaid user as retaining the GN 4-1 and allocates a session ID effective while the user retains it (for example, a session ID1), registers the GN-ID1 (see the following table 2) and transmits the session ID, along with a registration response, to the GN 4-1.

TABLE 2

Association Registration in LN-HA After Allocation of Session ID

| No. | Group ID or Session ID | LN-ID |
|---|---|---|
| 1 | Group 1 | LN-ID1 |
| 2 | Group 1 | LN-ID2 |
| 3 | Group 1 | LN-ID3 |
| 4 | Session ID1 | GN-ID1 |

(Procedure 2) Registration of LN-ID (2.1): When the GN 4-1 reads the LN-ID1, the GN 4-1 makes a request for a set of the GN-ID1 and the LN-ID1, together with the session ID (in this example, the session ID1), being in the LN-HA 12.

(2.2): Upon receipt of this request, the LN-HA 12 sees the registered contents of the aforesaid table 1 to retrieves a group to which the LN-ID1 pertains for registering the association between the LN-IDs (LN-ID1, LN-ID2, LN-ID3) of objects of this group and the GN-ID1, along with the session ID (see the following table 3). This function is realizable, for example, as one function of the aforesaid local position registration function unit (position control protocol stack) 123 (see FIG. 5). That is, this function unit 123 acts as a cooperation information registration control means to register, in the DB 124 serving as a storing means, the GN-ID included in the cooperation information received by the access side network interface 121 serving as a receiving means and a plurality of LN-IDs (LN-ID1, LN-ID2, LN-ID3) including the LN-ID1 included in this cooperation information in a state associated with each other. In addition, it functions as a retrieving means to retrieve the associated group, to which the LN-ID included in the cooperation information received by the aforesaid interface 121 belongs, in the DB 124 and further functions as a registering means to register, in the DB 124, the associated group retrieved by this retrieving means and the GN-ID included in the cooperation information received by the interface 121 in a state associated with each other.

(2.3): The LN-HA 12 transmits the LN-IDs (LN-ID1, LN-ID2, LN-ID3) of objects in the same group, along with a registration response, to the GN 4-1. That is, it reads the LN-ID of at least one LN 5-*j* of an LN group 5 to notify the LN group 5, associated with the LN 5-*j* read by the GN 4-*i*, to the GN 4-*i* which has registered the cooperation information. This can realize the cooperation information management in units of LN group 5. Incidentally, this function is also realized, for example, as one function of the aforesaid function unit 123. That is, in this case, the function unit 123 also functions as a notifying means to notify, to the GN 4-*i*, each of the LN-IDs (LN-ID1, LN-ID2, LN-ID3) pertaining to the associated group retrieved by the aforesaid retrieving means.

TABLE 3

Association Registration in LN-HA After Reading of LN-ID by GN

| No. | Group ID or Session ID | LN-ID |
|---|---|---|
| 1 | Group 1 | LN-ID1 |
| 2 | Group 1 | LN-ID2 |
| 3 | Group 1 | LN-ID3 |
| 4 | Session ID1 | GN-ID1 |
| 5 | Session ID1 | LN-ID1 |
| 6 | Session ID1 | LN-ID2 |
| 7 | Session ID1 | LN-ID3 |

Through the procedure 2, the allocation of the object group 5, (grouped) becomes feasible with respect to a session for each user, and the user can receive the information on the objects grouped. That is, the information on a plurality of objects becomes available through each object reading, which reduces the number of times of object reading.

(Procedure 3) Deletion of LN-ID (Deletion of the Association of Individual Resource)

(3.1): The GN 4-1 transmits the LN-ID to be deleted, along with the session ID, as a deletion request (partial deletion request) to the LN-HA 12.

(3.2): Upon receipt of this deletion request, the LN-HA 12 retrieves the association involving both the received session ID and LN-ID to delete it (see the following table 4). Thus, in the cooperation managing facility 1 made to register the association between the GN 4-i and the LN group 5 in its own LN cooperation information DB 124, the aforesaid cooperation information can be managed for each user who temporarily occupies the GN 4-i, and the LN 5-j corresponding to the deletion request from the user can be deleted from the cooperation information for each user this cooperation managing facility 1 retains. Incidentally, this function is also realizable, for example, as one function of the aforesaid function unit 123. In this case, when receiving a partial deletion request on a specific LN-ID from the GN 4-i, the function unit 123 functions as a partial cooperation information deleting means to delete that LN-ID from the cooperation information in the DB 124.

(3.3): The LN-HA 12 transmits a deletion response to the GN 4-1 which has issued the deletion request.

TABLE 4

Association Registration in LN-HA After Deletion of LN-ID1 of GN

| No. | Group ID or Session ID | LN-ID |
|---|---|---|
| 1 | Group 1 | LN-ID1 |
| 2 | Group 1 | LN-ID2 |
| 3 | Group 1 | LN-ID3 |
| 4 | Session ID1 | GN-ID1 |
| 5 | Session ID1 | LN-ID1 |
| 6 | Session ID1 | LN-ID2 |
| 7 | Session ID1 | LN-ID3 |

Through the aforesaid procedure 3, also in a case in which the user acquires the information on objects grouped, since only the unnecessary object registration is removable, the object selection by the user becomes realizable.

(Procedure 4) Deletion of the Association on All Users (4.1): The GN 4-1 transmits the session ID to be deleted as a deletion request (full deletion request on an associated group) to the LN-HA 12.

(4.2): The LN-HA 12 retrieves the association involving the session ID received to delete it (see the following table 5). This function is also realizable, for example, as one function of the aforesaid function unit 123. In this case, this function unit 123 functions as a cooperation information fill deletion means to delete the cooperation information forming the association information on this associated group and the GN-ID from the DB 124.

(4.3): The LN-HA 12 transmits a deletion response to the GN 4-1 which has issued the aforesaid deletion request.

TABLE 5

Association Registration in LN-HA After User Loses Retention of GN

| No. | Group ID or Session ID | LN-ID |
|---|---|---|
| 1 | Group 1 | LN-ID1 |
| 2 | Group 1 | LN-ID2 |
| 3 | Group 1 | LN-ID3 |
| 4 | Session ID1 | GN-ID1 |
| 5 | Session ID1 | LN-ID1 |
| 6 | Session ID1 | LN-ID2 |
| 7 | Session ID1 | LN-ID3 |

Through the aforesaid procedure 4, the full deletion is realizable in units of session on user.

Thus, for managing the objects (LN) 5-j a user uses, the LN-HA 12 can deal with objects as an aggregation of objects for each user without handling them individually. Therefore, for example, the objects such as a printer toner and a mouse which are not operable independently are previously manageable as an aggregation of a printer and a printer toner and an aggregation of a notebook type personal computer and a mouse and, hence, the management efficient to a user is realizable. In consequence, the number of times of explicit registration (access) in the LN-HA 12 (cooperation managing facility 1) by the user for the use of the object aggregation is considerably reducible.

(B7.2) Object Management Through Hierarchical Grouping of Objects Having a Parentage Relation to Each Other (Object Management Based on Hierarchization for Each User)

Secondly, a description will be given hereinbelow of a case in which the aforesaid object management based on the grouping is extended so that, when the parentage relation exists between grouped objects, the registration/deletion of the child object is made together with the parent object. In the following description, let it be assumed that the LN-ID1, LN-ID2 and LN-ID3, which are respectively the LN-IDs of the LNs 5-1, 5-2 and 5-3, are already registered as the same group 1 in the LN-HA 12 wherein the LN-ID1 forms the parent LN-ID of the LN-ID2 and LN-ID3, and the LN-ID1, i.e., the parent LN-IF, does not exist (null: see the following table 6) and is read by the GN 4-1. Moreover, in this example, the GN-ID of the GN 4-1 is GN-ID1.

In this connection, the data (table) shown in the following table 6 can also be retained in the aforesaid LN cooperation information DB 124. That is, in this case, the DB 124 functions as a hierarchically associated group retaining means to retain a hierarchically associated group based on the parentage between the LN-IDs (LN-ID1, LN-ID2, LN-ID3) of a plurality of LNs 5-1 to 5-3. Naturally, this data can also be retained in a recording medium such as a dedicated memory different from the LN cooperation information DB 124.

TABLE 6

Association Registration in LN-HA in Initial State

| No. | Group ID or Session ID | Parent LN-ID | LN-ID |
|---|---|---|---|
| 1 | Group 1 | Null | LN-ID1 |
| 2 | Group 1 | LN-ID1 | LN-ID2 |
| 3 | Group 1 | LN-ID1 | LN-ID3 |

(Procedure 1) Session ID Allocation When User Temporarily Retains GN 4-1

(1.1): When one user uses the GN 4-1, this user makes the GN 4-1 read his/her ID card. The GN 4-1 transmits a registration request along with the GN-ID1 to the LN-HA 12 for registering, in the LN-HA 12, the fact that a specific user retains the GN 4-1.

(1.2) The LN-HA 12 regards the user as retaining the GN 4-1 and allocates a session ID effective while the user retains it (in this case, session ID1), and registers the GN-ID (in this case, GN-ID1) and transmits it, along with a registration response, to the GN 4-1.

TABLE 7

Association Registration in LN-HA After Allocation of Session ID

| No. | Group ID or Session ID | Parent LN-ID | LN-ID |
|---|---|---|---|
| 1 | Group 1 | Null | LN-ID1 |
| 2 | Group 1 | LN-ID1 | LN-ID2 |
| 3 | Group 1 | LN-ID1 | LN-ID3 |
| 4 | Session ID1 | Null | GN-ID1 |

(Procedure 2) Registration of LN-ID (2.1) When the GN 4-1 reads the LN-ID1, the GN 4-1 makes a request for registering a set of the GN-ID1 and the LN-ID1, along with the session ID (in this case, session ID1), in the LN-HA 12.

(2.2) The LN-HA 12 retrieves a group to which the LN-ID1 pertains, and registers the association between the LN-IDs (LN-ID1, LN-ID2, LN-ID3) of objects in the retrieved group and the GN-ID1, along with the session ID. At this time, the parentage retained in the group 1 is directly handed over (see the following table 8).

TABLE 8

Association Registration in LN-HA After Reading of LN-ID by GN

| No. | Group ID or Session ID | Parent LN-ID | LN-ID |
|---|---|---|---|
| 1 | Group 1 | Null | LN-ID1 |
| 2 | Group 1 | LN-ID1 | LN-ID2 |
| 3 | Group 1 | LN-ID1 | LN-ID3 |
| 4 | Session ID1 | Null | GN-ID1 |
| 5 | Session ID1 | GN-ID1 | LN-ID1 |
| 6 | Session ID1 | LN-ID1 | LN-ID2 |
| 7 | Session ID1 | LN-ID1 | LN-ID3 |

This function is realizable, for example, as one function of the aforesaid local position registration function unit (position control protocol stack) 123. In this case, the function unit 123 functions as a retrieving means to retrieve, in the DB 124 serving as the aforesaid hierarchically associated group retaining means, an associated group to which the LN-ID included in the cooperation information received by the access side network interface 121 serving as a receiving means pertains as a high-hierarchical LN-ID, and further functions as a registering means to register, in the cooperation information DB 124, a high-hierarchical LN-ID of the hierarchically associated group retrieved by this retrieving function, a low-hierarchical LN-ID associated with this high-hierarchical LN-ID and the GN-ID included in the cooperation information received by the interface 121 in a state associated with each other.

(2.3) The LN-HA 12 transmits the LN-IDs (LN-ID1, LN-ID2, LN-ID3) of the objects pertaining to the same group, along with a registration response, to the GN 4-1. Thus, in the cooperation managing facility 1 made to previously retain a hierarchically associated group based on the parentage between a plurality of LDs 5-$j$, after the reading of a high-hierarchical LN 5-$j$ existing in a hierarchical associated group, the hierarchically associated group including this LN 5-$j$ and lying in a low hierarchy is notified to the GN 4-1 which has read the aforesaid high-hierarchical LN 5-$j$, thereby realizing the cooperation information management using the hierarchically associated group.

That is, in the LN-HA 12, through this procedure 2, the allocation of the object group 5, hierarchically grouped, becomes feasible with respect to a session for each user, and the user can receive the information on the objects 5-$j$ hierarchically grouped. This signifies that the information on a plurality of objects 5-$j$ becomes available through each object reading. Also in this case, the number of times of object reading is considerably reducible.

(Procedure 3) Deletion of LN-ID (Deletion of the Association Between Individual Resources)

(3.1) The GN 4-1 transmits the LN-ID to be deleted, along with the session ID, as a deletion request (partial deletion request on LN-ID) to the LN-HA 12.

(3.2) Upon receipt of this deletion request, the LN-HA 12 retrieves the association involving both the received session ID and LN-ID (corresponding to the no. 5 row in the following table 9) and retrieves the association in which this LN-ID forms parent LN-ID (corresponding to the Nos. 6 and 7 rows in the table 9). This retrieval is repeatedly conducted until the parent LN-ID falls into no association. The LN-HA 12 deletes all the associations appearing through this operation (deleting all the Nos. 5, 6 and 7 rows in the table 9).

TABLE 9

Association Registration in LN-HA After Deletion of LN-ID1 of GN

| No. | Group ID or Session ID | Parent LN-ID | LN-ID |
|---|---|---|---|
| 1 | Group 1 | Null | LN-ID1 |
| 2 | Group 1 | LN-ID1 | LN-ID2 |
| 3 | Group 1 | LN-ID1 | LN-ID3 |
| 4 | Session ID1 | Null | GN-ID1 |
| 5 | Session ID1 | GN-ID1 | LN-ID1 |
| 6 | Session ID1 | LN-ID1 | LN-ID2 |
| 7 | Session ID1 | LN-ID1 | LN-ID3 |

This function is also realizable, for example, as one function of the aforesaid local position registration function unit 123. In this case, the function unit 123 functions as a partial hierarchical cooperation information detecting means to, upon receipt of a partial deletion request on a specific LN-ID from the GN 4-1, delete this LN-ID and all the low-hierarchical LN-IDs (child LN-IDs) relative thereto from the cooperation information in the DB 124.

(2.3) The LN-HA 12 transmits a deletion response to the GN 4-1.

In a case in which a user acquires the information on the grouped objects 5-*j* through the procedure 3, the registration information on the objects 5-*j* are deleted due to the parentage. At the time that the parent object is deleted, the child objects are automatically deleted, thereby decreasing the number of times of deletion processing by the user.

(Procedure 4) Deletion of All Association on User (4.1) The GN 4-1 transmits the session ID to be deleted as a deletion request (full deletion request on a hierarchically associated group) to the LN-HA 12.

(4.2) The LN-HA 12 retrieves the association involving the received session ID and deletes it (see the following table 10).

TABLE 10

Association Registration in LN-HA After User Loses GN

| No. | Group ID or Session ID | Parent LN-ID | LN-ID |
|---|---|---|---|
| 1 | Group 1 | Null | LN-ID1 |
| 2 | Group 1 | LN-ID1 | LN-ID2 |
| 3 | Group 1 | LN-ID1 | LN-ID3 |
| 4 | Session ID1 | Null | GN-ID1 |
| 5 | Session ID1 | GN-ID1 | LN-ID1 |
| 6 | Seesion ID1 | LN-ID1 | LN-ID2 |
| 7 | Session ID1 | LN-ID1 | LN-ID3 |

This function is also realizable, for example, as one function of the aforesaid local position registration function unit 123. In this case, the function unit 123 functions as a full hierarchical cooperation information detecting means to, upon receipt of a full deletion request on a hierarchically associated group from the GN 4-1, delete the cooperation information, including the association information between each of the LN-IDs of high and low hierarchies of the hierarchically associated group and the GN-ID, from the DB 124.

(4.3) The LN-HA 12 transmits a deletion response to the GN 4-1.

Through this procedure 4, the full deletion can be realized in units of session on user.

In this way, the LN-HA 12 can manage the objects in the form of a hierarchical group for each user. Therefore, for example, for canceling the use of a high-hierarchical object 5-*j*, in a case in which the using state of the low-hierarchical object 5-*j* becomes useless (in the case of the cancellation of the use of a notebook PC, the use of a mouse and a keyboard becomes unnecessary, the like), when a user cancels the use of the hierarchical object 5-*j*, all the low-hierarchical objects 5-*j* can be canceled, thereby considerably reducing the number of times of object use cancellation processing.

[B8] Shifting of GN Function Because of Employment of DN

Furthermore, a description will be given hereinbelow of, when a user possesses a DN 6 (see FIG. 1), the DN 6 and a facility designed to read the DN 6 into the GN 4-*i* so that the GN 4-*i* receives the contents selectively.

(B8.1) Shifting of GN Function Based on Hierarchization of DN 6

Figure 26:
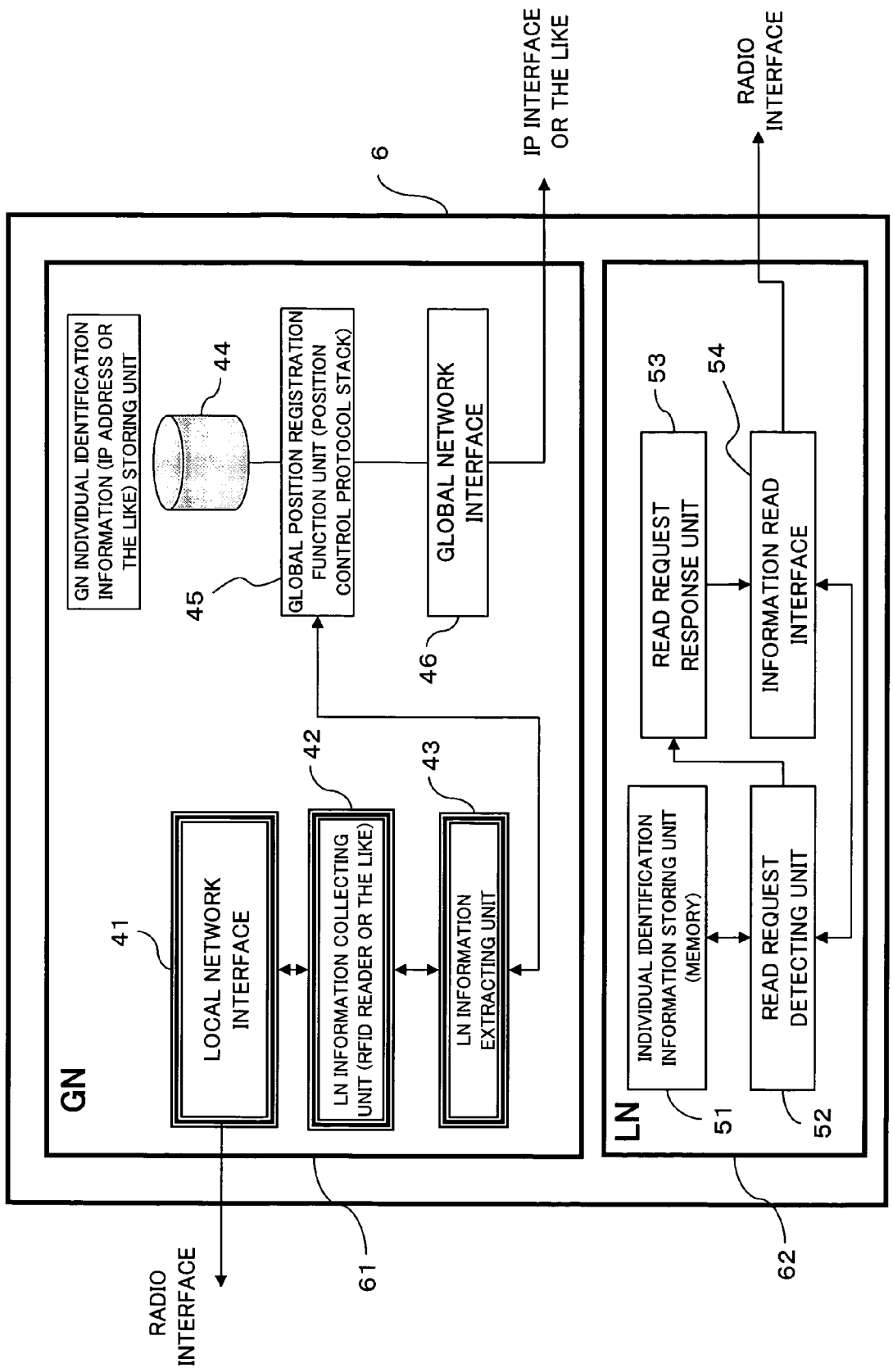
FIG. 26 is a functional block diagram showing a configuration of the DN shown in FIG. 1.

FIG. 26 is a functional block diagram showing a configuration of the DN 6 according to this embodiment. In FIG. 26, the DN 6 is composed of a GN function unit 61 functioning as the GN 4-*i* as mentioned above with reference to FIG. 2 and an LN function unit 62 function in gas the LN 5-*j* mentioned above with reference to FIG. 3, with these function units 61 and 62 being made to operate independently of each other. The GN function unit 61 includes a local network interface 41, an LN information collecting unit (Rf-ID reader, or the like) 42, an LN information extracting unit 43, a GN individual identification information storing unit 44, a global position registration function unit 45 and a global network interface 46, each of which is similar to that mentioned above with reference to FIG. 2, while the LN function unit 62 includes a individual identification information storing unit (memory) 51, a read request detecting unit 52, a read request response unit 53 and an information read interface 54, each of which is similar to that mentioned above with reference to FIG. 3.

Figure 27:
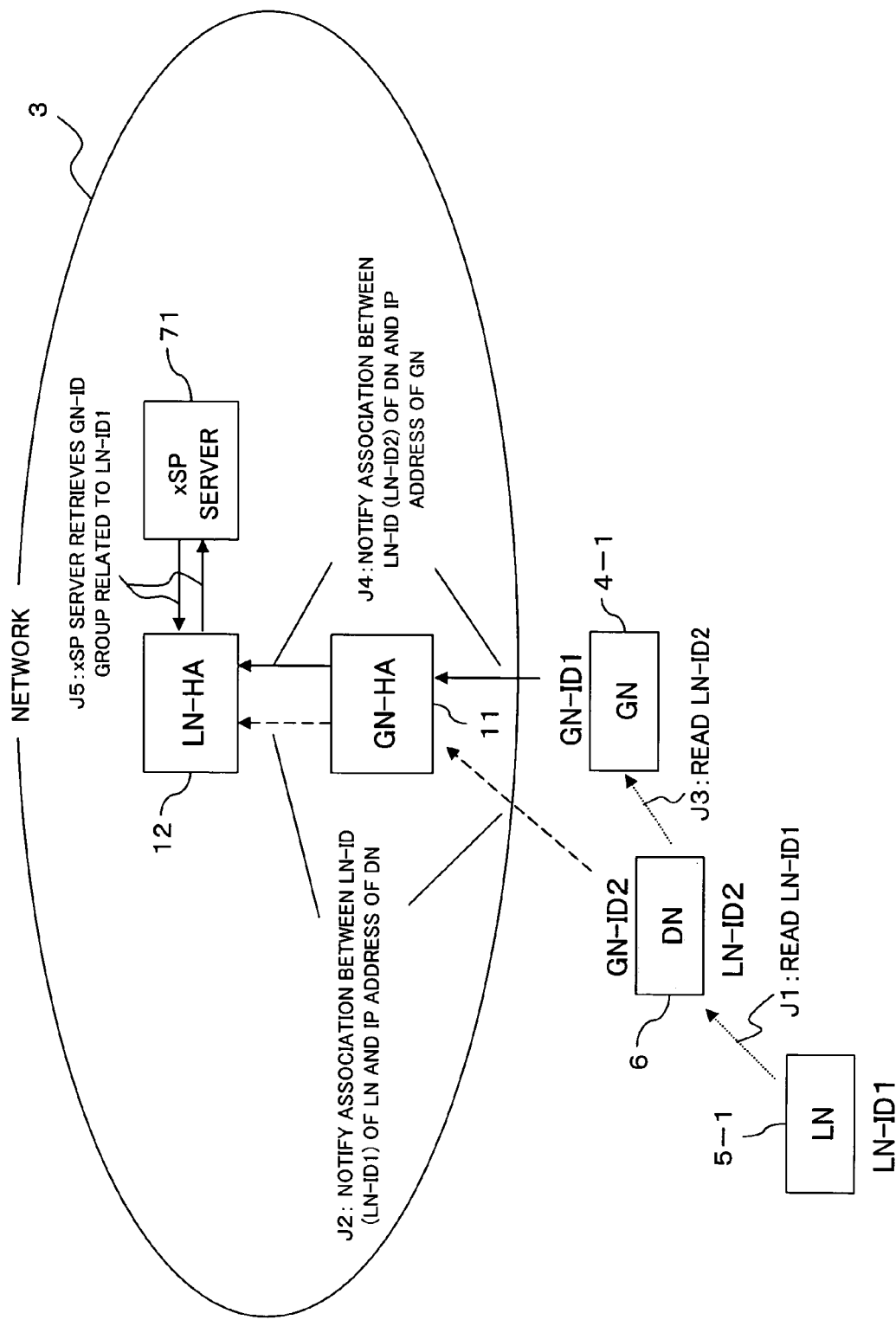
FIG. 27 is an illustration useful for explaining an operation of a network including the DN of the cooperation information managing system shown in FIG. 1.

Referring to FIGS. 27 to 29, a detailed description will be given hereinbelow of an example of, on the network 3, operation of the DN 6 combining both the function as the GN 4-*i* and function as the LN 5-*j*. However, in the following description, the LN 5-1 has the LN-ID1 as an RF-ID (LN-ID), the GN 4-1 has the GN-ID1 as the GN-ID, and the DN 6 has two IDs: the GN-ID2 as the GN-ID and the LN-ID2 as the RF-ID (LN-ID).

(Operation at Registration)

For example, as shown in FIG. 27, when the DN 6 reads the RF-ID (LN-ID1) of the LN 5-1 so that it serves as a node (GN function node) functioning as the GN (step J1), the DN 6 transmits, as the cooperation information, the association between the ID (LN-ID1) of the LN 5-1 and its own GN-ID (GN-ID2: for example, an IP address of the DN6) to the GN-HA 11 and the LN-HA 12 to register the cooperation information (first cooperation information) (step J2).

Following this, for example, the GN 4-1 reads the RF-ID (LN-ID2) of the DN 6 handled as the LN when viewed from the GN 4-1 (step J3), and transmits, as the cooperation information, the association between the RF-ID (LN-ID2) and its own GN-ID (GN-ID1: for example, an IP address of the GN 4-1) to the GN-HA 11 and the LN-HA 12 for the registration of the cooperation information (second cooperation information) (step J4). Incidentally, it is also acceptable to permute the registration processing in the steps J1 and J2 and the registration processing in the steps J3 and J4.

That is, in this case, each of the access side network interfaces 111 and 121 in the GN-HA 11 and the LN-HA 12 functions as a first receiving means to receive a set of the LN-ID the DN6 reads from the LN 5-*j* and the GN-ID the DN 6 retains, as first cooperation information, from the DN 6, and further functions as a second receiving means to receive a set of the LN-ID of the DN 6 read from the DN 6, which has read the LN-ID of the LN 5-*j*, by the GN 4-*i* and the GN-ID of this GN 4-*i*, as second cooperation information, from this GN 4-*i*.

Figure 28A:
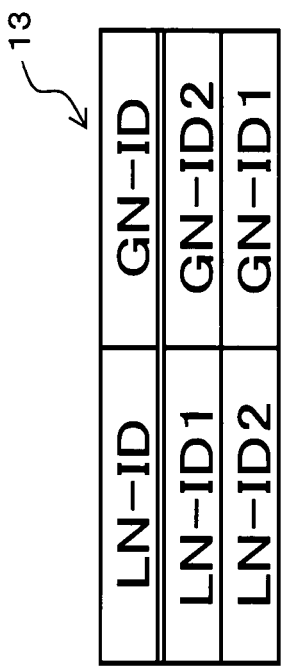
FIG. 28(A) is an illustration of an example of a cooperation information table in the LN-HA shown in FIG. 1.
Figure 28B:
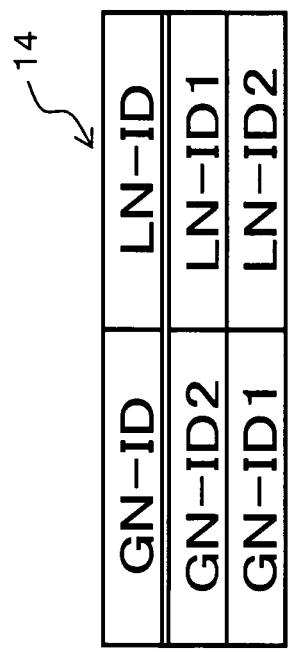
FIG. 28(B) is an illustration of an example of a cooperation information table in the GN-HA shown in FIG. 1.
Figure 28C:
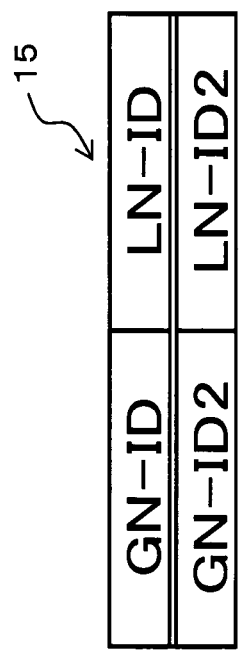
FIG. 28(C) is an illustration of an example of a correspondence table in the LN-HA and the GN-HA shown in FIG. 1.

FIG. 28(A) shows an example of registration contents of an LN cooperation information table 13 to be retained/managed in the LN-HA 12 when the registration procedure of the aforesaid steps J1 to J4 comes to an end, FIG. 28(B) shows an example of registration contents of a GN cooperation information table 14 to be retained/managed in the GN-HA 11 when the registration procedure of the aforesaid steps J1 to J4 comes to an end, and FIG. 28(C) shows an example of registration contents of a correspondence table 15 between the GN-ID and LN-ID of the DN 6 previously managed in the LN-HA 12 or the GN-HA 11.

For example, the LN cooperation information table 13 is held (registered) in the form of table format data in the LN cooperation information DB 124 (see FIG. 5) of the LN-HA 12, and the GN cooperation information table 14 is held (registered) in the form of table format data in the GN cooperation information DB 114 (see FIG. 4 or 12) of the GN-HA 11. Moreover, the correspondence table 15 is held (registered)

as table format data in the LN cooperation information DB 124 in the case of the LN-HA 12, while being held (registered) as the table format data in the GN cooperation information DB 114 in the case of the GN-HA 11.

This registration function is realizable, for example, as one function of each of the position control protocol stacks 113 and 123 of the GN-HA 11 and the LN-HA 12. In this case, the position control protocol stacks 113 and 123 functions as cooperation information registration control means to register the aforesaid first and second cooperation information received by the aforesaid interfaces 111 and 121, in a state associated with each other, for example, in the DBs 114 and 124 serving as storing means.

Meanwhile, there is a case in which a network manager previously retains an RF-ID (LN-ID2) given to a network terminal such as the DN 6. For example, in the case of a portable terminal put on the market by a type I telecommunications carrier, there is a case that the type I telecommunications carrier retains the association between a unique GN-ID to be managed on its own network 3 and an LN-ID given to a portable terminal sold to a user.

In such a case, in FIG. 26, an xSP server 71 carries out the retrieval on the LN cooperation information DB 124 (see FIG. 5) of the LN-HA 12 (step J5), and in the case of transmitting the contents on the LN-ID1 to the GN 4-1 having the object 5-1 of the LN-ID1, the xSP server 71 first carries out the retrieval in the LN cooperation information table 13 shown in FIG. 28(A) with the LN-ID1 being used as a retrieval key, thereby seeing the GN-ID2 corresponding to the LN-ID1.

Following this, the LN-HA 12 carries out the retrieval on the correspondence table 15 shown in FIG. 28(C) with the GN-ID2 being used as a retrieval key for the purpose of making a decision as to whether or not the node retaining the GN-ID2 is the DN 6. As a result thereof, in the correspondence table 15 shown in FIG. 28(C), an entry having the GN-ID2 as a key is seen, thus obtaining the LN-ID2 corresponding to the GN-ID2. Moreover, the retrieval on the LN cooperation information table 13 shown in FIG. 28(A) is again made with the LN-ID2 being used as a key to see the GN-ID1. Likewise, when the retrieval on the correspondence table 15 shown in FIG. 28(C) is made with the GN-ID1 being used as a retrieval key, no entry exists. Therefore, the GN-ID of the node retaining the final association with respect to the LN-ID1 is determined as the GN-ID1.

According to the above-mentioned retrieval result, the LN-HA 12 returns the GN-ID1, as the GN-ID corresponding to the LN-ID1, to the xSP server 71. When receiving the GN-ID1 from the LN-HA 12, the xSP server 71 transmits the contents on the LN-ID1 with this GN-ID1 being used as a destination address. Thus, the contents are received through the GN-HA 11 by the GN 4-1 which has read the LN 5-1 through the DN 6.

Accordingly, in this example, when the user using the DN 6 reads the LN-ID of the DN 6 through the use of a GN function node (GN 4-1) other than this DN 6 on purpose, the user can change the using network terminal (node) from the DN 6 to the GN 4-1 to temporarily shift the GN function, the DN 6 uses, to another GN function node 4-1. Also in this case, the contents on the LN 5-j (LN-ID), or the like, can normally and continuously be received by the GN 4-1.

Accordingly, for example, in a case in which the performance (memory, CPU, interface speed, and the like) of the DN 6 for the convent reception falls short or is insufficient, the user makes the GN 4-i with a sufficient performance read the DN 6 in use so that the GN 4-i operates as a GN function node, thereby continuing the content reception through the use of the GN 4-i.

(Operation at Cancellation)

On the other hand, in the case of canceling the cooperation between the GN 4-1 and the DN 6, i.e., for switching from the content reception in the GN 4-1 to the content reception in the DN 6, as shown in FIG. 27, the user having the GN 4-1 can carry out the cancellation of the association between the GN-ID1 and the LN-ID2 with respect to the GN-HA 11 and the LN-HA 12. That is, for example, when the user conducts the cancellation operation with respect to the GN 4-1 or when the connection between the DN 6 and the GN 4-1 is cut off, the GN 4-1 issues a request for the cancellation of the association between the GN-ID1 and the LN-ID2 to the GN-HA 11 and the LN-HA 12, and upon receipt of this request, the GN-HA 11 and the LN-HA 12 delete the second-line entries in the cooperation information tables 13 and 14 shown in FIGS. 29(A) and 29(B), respectively. Incidentally, this function is realizable, for example, as one function of each of the aforesaid position control protocol stacks 113 and 123. In this case, upon receipt of the aforesaid association cancellation request from the DN 6, each of the protocol stacks 113 and 123 functions as a cooperation information deleting means to delete the association between the aforesaid first and second cooperation information in each of the DBs 123 and 124.

In this state, the xSP server 71 again carries out the retrieval on the tables 13 and 15 of the LN-HA 12 shown in FIGS. 29(A) and 29(C). That is, the LN-HA 12 conducts the retrieval on the LN cooperation information table 13 shown in FIG. 27(A) with the LN-ID1 being used as a retrieval key to acquire the GN-ID2 corresponding to the LN-ID1. Subsequently, the LN-HA 12 makes the retrieval on the correspondence table 15 shown in FIG. 29(C) with this GN-ID2 being used as a retrieval key for the purpose of making a decision as to whether the node retaining the GN-ID2 is the DN 6.

As a result, in the correspondence table 15 shown in FIG. 29(C), the entry on the GN-ID2 is referred to, thus obtaining the LN-ID2 corresponding to the GN-ID2. Moreover, the LN-HA 12 again carries out the retrieval on the LN cooperation information table 13 shown in FIG. 29(A) with the LN-ID2 being used as a retrieval key and, in this case, since the entry corresponding to the LN-ID2 is already deleted as shown in FIG. 29(A), the LN-HA 12 returns the GN-ID2, as the final GN-ID corresponding to the LN-ID1, to the xSP server 71. In response to this, the xSP server 71 transmits the contents on the LN-ID1 (LN 5-1) to the DN 6 having the GN-ID2 corresponding to the LN-ID1.

In this way, also after the shifting of the GN function, the content reception side can properly be restored (changed) from the GN 4-1 to the DN 6.

(B8.2) Change of Real-Time Flow According to DN Decision Based on DN Hierarchy

Although in the above-described example the content output destination (reception side) can be changed between the DN 6 and the GN 4-i, since the reception side is changed at the initiative of the xSP server 71, difficulty can be encountered in coping with the real-time route change. For this reason, referring to FIGS. 30 to 34, a description will be given hereinbelow of a method in which the LN-HA 12 detects a change of cooperation information and a method in which a route change is notified to the xSP server 71.

(Operation at Registration)

First, for example, as shown in FIG. 30, when the LN-HA 12 receives the cooperation information and changes the registration contents of the cooperation information (steps J1 to J4) as in the case shown in FIG. 27, the change of the cooperation information is notified to the xSP server 71 (step J5'). At this time, for example, let it be assumed that, when a DN 6-1, the user retains, is reading a plurality of objects (LNs 5-3 and 5-4) as shown in FIG. 31(A), the user can shift the GN function from the DN 6-1 to a DN 6-2 (the DN 6-2 is set as the GN function node). Moreover, let it be assumed that each of the DNs 6-1 and 6-2 has a configuration identical or similar to the configuration shown in FIG. 26. Still moreover, the LN 5-3 has the LN-ID 3 and the LN 5-4 has the LN-ID 4, while the DN 6-1 retains the GN-ID1 and LN-ID1, and the DN 6-2 retains the GN-ID2 and LN-ID2.

In this case, for example, the LN-HA 12 has, as shown in FIGS. 31(B1) and 31(C1), the cooperation information tables (LN-ID management tables) 16 and 17 including the association (cooperation information) between the LN-ID and the GN-ID for each session (LN-ID session) of the LNs 5-3 and 5-4 and has, as shown in FIG. 31(D), a DN database 18 including the GN-ID and the LN-ID allocated to the DNs 6-1 and 6-2. Incidentally, each of these tables 16, 17 and database 18 can fully or partially be retained as table format data in the LN cooperation information DB 124 (see FIG. 5), or it can also be placed in another DB or the like. The reason why the LN-ID management tables 16 and 17 are prepared for each LN-ID session is for detecting the change of the cooperation information for each LN-ID.

In addition, FIGS. 31(B1) and 31(C1) are illustrations of the registration states of the cooperation information in the management table 16 on the LN-ID3 session and the management table 17 on the LN-ID4 in the LN-HA 12 after the DN 6-1 reads the LNs 5-3 and 5-4. In the example shown in FIG. 31(B1), the LN-HA 12 registers, as the cooperation information, the association between the LN-ID 3 read by the DN 6-1 and the GN-ID1 of this DN 6-1 on the first line of the management table 16 as shown in FIG. 31(B1). Subsequently, the LN-HA 12 carries out the retrieval on the DN database 18 shown in FIG. 31(D) with the registered GN-ID1 being used as a retrieval key, thereby obtaining the LN-ID1 corresponding to the GN-ID1.

At this time, the LN-HA 12 registers only the LN-ID1 obtained through the aforesaid retrieval in the second-line entry of the management table 16 as shown in FIG. 31(B1). This is because a high-order node (in this case, the DN 6-2) reading the LN-ID1 (DN 6-1) next previously seizes the fact that it is registered in the entry on the LN-ID3 session in the management table 16a.

In the registration state in the management table 16 on the LN-ID 3 shown in FIG. 31(B1), in a case in which the xSP server 71 retrieves the corresponding GN-ID in the management table 16 in a manner such that the LN-ID3 is used as a retrieval key, since, for the final entry corresponding to the LN-ID3, the GN-ID1 is obtained as a retrieval result, the xSP server 71 receives the notification on this GN-ID1 to continuously transmit the contents or the like according to the attribute of the LN-ID3 (LN 5-3), read by the DN 6-1, to the DN 6-1 retaining (allocated) that GN-ID1.

Let it be assumed that the user reads the LN-ID (LN-ID1) of the DN 6-1 through the use of the different DN 6-2 shown in FIG. 31(A) on purpose while the DN 6-1 is receiving the contents or the like from the xSP server 71.

In this case, the DN (GN function node) 6-2 registers the cooperation information (the association between the LN-ID1 and the GN-ID2) in the LN-HA 12, and the LN-HA 12 detects the registration of the cooperation information matching with the LN-ID1 in FIG. 31(B1) and stores the association between the LN-ID1 and the GN-ID2 in the management table 16 on the LN-ID3 as shown in FIG. 31(B2). In this case, the LN-ID2 is also registered in the third-line entry of the management table 16. This reason is the same as that in FIG. 31(B1). At this time, as well as the registration state shown in FIG. 31(B2), the LN-HA 12 registers the cooperation information (the association between the LN-ID1 and the GN-ID2) as shown in FIG. 31(C2) because the management table 17 on the LN-ID4 shown in FIG. 31(C1) has the same registration state as that in FIG. 31(B1).

Moreover, when the management tables 16 and 17 are rewritten as mentioned above, through the use of a cooperation information change notification message (see item no. 1 in FIG. 32), the LN-HA 12 transmits, to the xSP server 71, the LN-IDs registered in the leading portions (first-line entry) of the management tables 16 and 17 on the LN-ID3 and the LN-ID4, the final (that is, the current) GN-ID (in this case, GN-ID2 in the second-line entry) associated therewith and the old GN-ID (in this case, GN-ID1) retrieved in the DN database 18 shown in FIG. 31(D) in a manner such that the LN-ID1 is used as a retrieval key, thereby enabling the instruction on the route switching to the xSP server 71 (setting the route from the xSP server 71 to the DN 6-2) at the initiative of the GN function node (in this case, the DN 6-2). The xSP server 71 returns, to the LN-HA 12, a response to the aforesaid cooperation information change notification message (OK or NG) through the use of a cooperation information change notification response message (see item no. 2 in FIG. 32).

(Operation at Cancellation)

Secondly, a description will be given hereinbelow of a case (cooperation information cancellation operation) in which the user returns the node, which receives the contents, from the DN 6-2 to the DN 6-1 in a state where the DN 6-2 is receiving the contents or the like on the LN-ID3.

This cancellation operation is implemented in a manner such that the DN 6-2 transmits, to the LN-HA 12, a request message on the cancellation of the association (see item no. 1 in FIG. 33) between its own GN-ID (GN-ID2) and the read LN-ID (LN-ID1). That is, upon receipt of the cancellation request message, the LN-HA 12 cancels (deletes) the cooperation information as shown in FIGS. 34(A), 34(B) and 34(C). After carrying out the cancellation of the cooperation information in this way, the LN-HA 12 returns a cooperation information cancellation response message (see item no. 2 in FIG. 33) as a response (OK or NG) to the aforesaid cancellation request message to the DN (GN function node) 6-2.

Thus, when the cancellation of the cooperation information is made with respect to each LN-ID, the switching of the data transfer route becomes feasible.

This method is also easily applicable to a case in which a plurality of DNs 6 are hierarchically connected to each other or a case in which a plurality of GN 4-i each reading the LN-ID exist. Moreover, in a case in which the LN-ID is an ID of a user which is under control of the xSP server 71 or the like, the xSP server 71 can make a specific user continuously and normally receive the contents or the like at all times even at a change of the using network terminal.

Incidentally, the data transfer route changing (a change of the real-time flow) function is also realizable, for example, as one function of the aforesaid position control protocol stack 123. In this case, the protocol stack 123 functions as a monitoring means to monitor the production and cancellation of the association between the aforesaid first and second cooperation information in the LN cooperation information DB 124 and further functions as a transmission destination (reception side) change instructing means to, when the monitoring means confirms the production of the association, recognize that the unit (node) using the LN 5-1 is changed from the DN 6 to the GN 4-i and to transmit, to the xSP server 71 forming the source of the information on the LN 5-j, an instruction for changing the receiving side of the information on the LN 5-*j* to the GN 4-*i* and, on the other hand, when the monitoring means confirms the cancellation of the association, to recognize that the node using the LN 5-*j* is changed from the GN 4-*i* to the DN 6 and to transmit, to the xSP server 71, an instruction for changing the receiving side of the information on the LN 5-*j* to the DN 6.

(C) Supplementary Description

Figure 37:
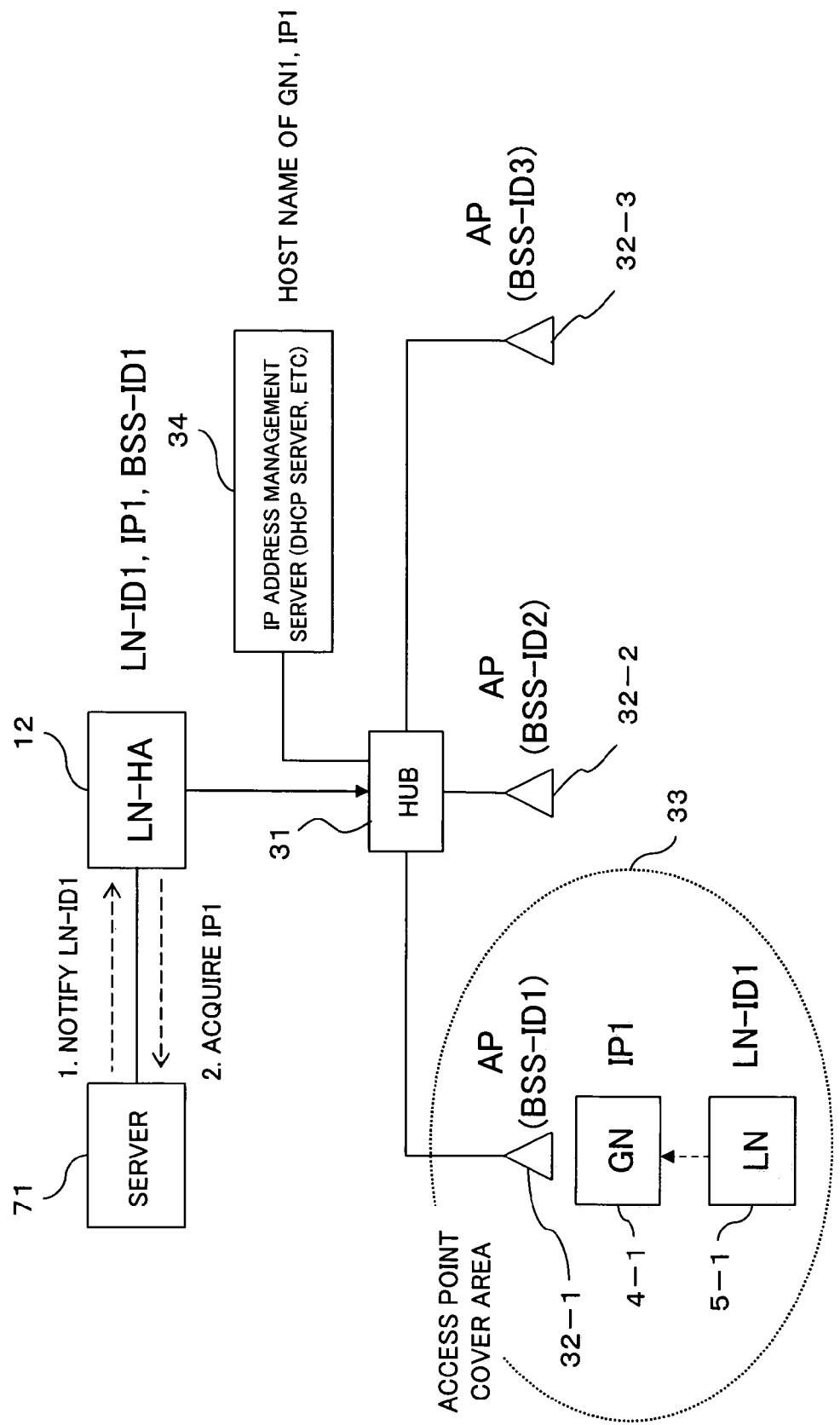
FIG. 37 is an illustration useful for explaining a supplementary description 3 (using a radio LAN) of this embodiment.
Figure 38:
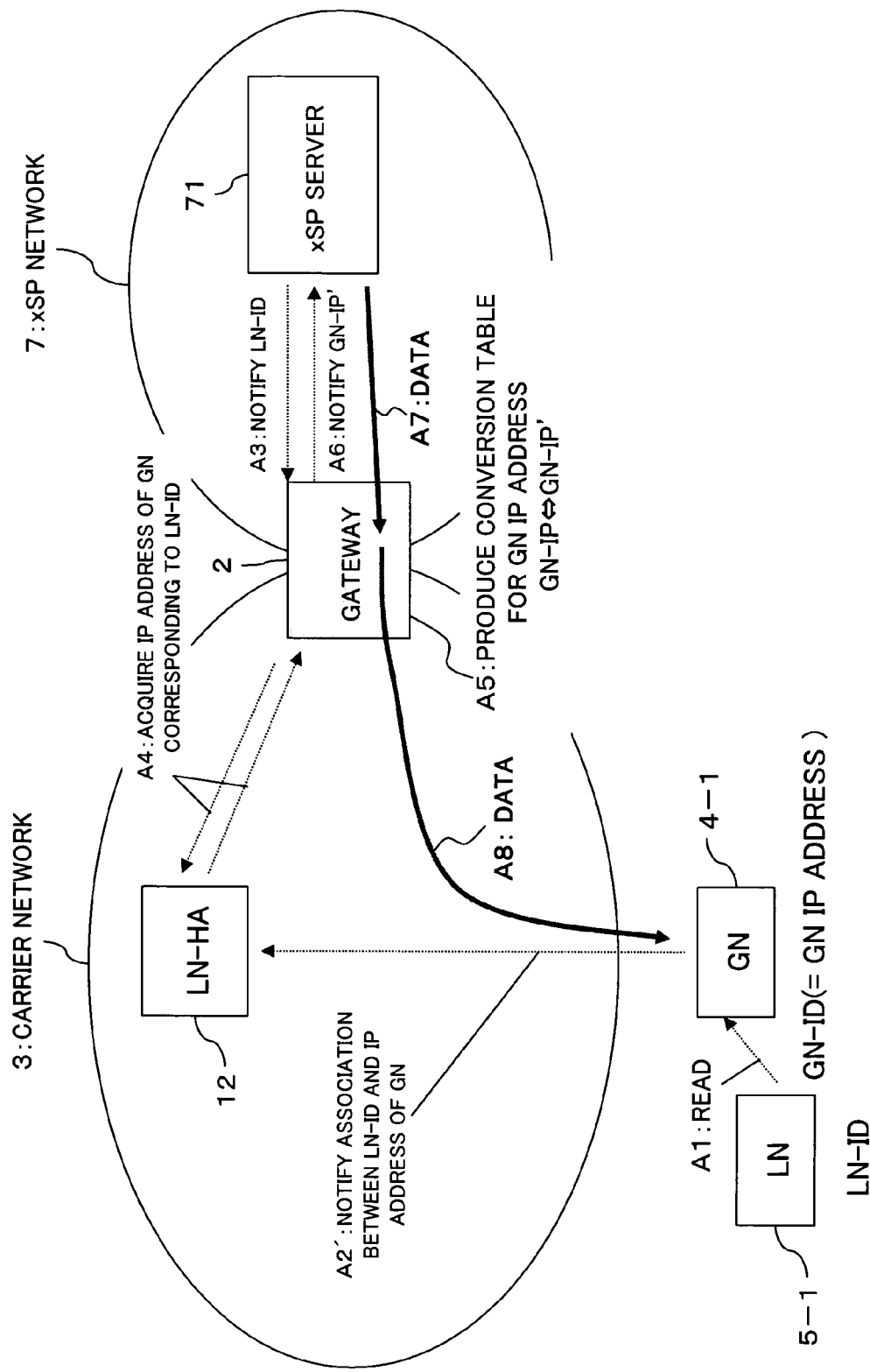
FIG. 38 is an illustration useful for explaining a supplementary description 4 (operation of a network including a gateway) of this embodiment.

Although the above-described embodiment considers a case in which two HAs such as the GN-HA 11 managing the GN 4-*i* and the LN-HA 12 managing the LN 5-*j* are operated in cooperation with each other, the present invention is not limited to this, but it is also applicable to a case in which the LN-HA 12 is singly operated. Although the GN-HA 11 fulfills the function as HA in the mobile IP, the present invention does not always require the existence of the mobile IP, GN-HA and IP core network. For example, as shown in FIGS. 35, 36 and 37, the present invention is also applicable to a radio access network such as a radio LAN (Local Area Network), and as shown in FIG. 38, the present invention is also applicable to a case in which no mobile IP is put to use. A description will be given hereinbelow of these modifications.

(C1) Embodiment Using Radio LAN (Supplementary Description 1)

As shown in FIG. 35, assume a radio LAN network configuration in which the line concentration of a plurality of access points 32-1, 32-2 and 32-3 such as radio base stations (BS) is made through the use of a hub 31 and the LN-HA 12 and the xSP server 71 are communicable through the hub 31 with GN 4-*i* connected through radio line to any one of the access points (AP) 32-1, 32-2 and 32-3. In this case, the access points 32-1, 32-2 and 32-3 have BSS-ID1, BSS-ID2 and BSS-ID3 as their identifiers, respectively. Moreover, the GN 4-1 has IP1 as the GN-ID (GN-IP address), and the LN 5-*j* has LN-ID1 as the LN-ID.

In this case, for example, when the GN 4-1 existing in a cover area 33 of the AP 32-1 reads the LN-ID1 of the LN 5-1, the LN-ID, the GN-IP address (IP1) and the BSS-ID (BSS-ID1) indicative of a MAC (Media Access Control) address of the AP 32-1 are registered in the DB 124 of the LN-HA 12 (see FIG. 5) on the radio network. In this case, the LN-ID can be information such as an ID of the user on the network.

The xSP server 71 makes the retrieval on the DB 124 in the LN-HA 12 with the LN-ID (in this case, LN-ID1) being used as a retrieval key to obtain the corresponding IP address (IP1) and transmits the streaming contents or the like suitable for the LN-ID1 to this address. In this connection, in a case in which the information (attribute of the GN 4-*i*, or the like) other than the GN-IP address is also retained in the LN-HA 12, it is also possible that the server 71 acquires the attribute of the GN 4-*i* from the LN-HA 12 to transmit the contents or the like according to the attribute of the GN 4-*i*.

(C2) Embodiment Using Radio LAN (Supplementary Description 2)

Secondly, a description will be given hereinbelow of a case in which, in the configuration shown in FIG. 35, a plurality of GNs 4-*i*, i.e., the GNs 4-1 and 4-2, read the same LN 5-1. For example, this is a case in which a user having a user ID card uses a plurality of GNs 4-*i*, i.e., GN 4-1 and 4-2. According to a procedure similar to that in the above-mentioned supplementary description, the xSP server 71 transmits the streaming contents or the like suitable for the LN-ID1 to a plurality of GN-IP addresses (IP 1, IP 2) corresponding to the LN-ID (in this case, LN-ID1).

(C3) Embodiments Using Radio LAN (Supplementary Description 3)

Furthermore, FIG. 37 shows a case in which an IP address managing server 34 such as a DHCP server exists in a network including the LN-HA 12. In FIG. 37, the same reference numerals as those in the above description depict the same or corresponding devices. In this case, the GN 4-*i* (in this case, GN 4-1) can put, in the cooperation information of the LN-HA 12, an IP address (IP1) acquired from the IP address managing server 34.

That is, after acquiring the IP address=IP1 from the IP address managing server 34, the GN 4-1 reads the LN-ID1 of the LN 5-1 and registers, as the cooperation information, a combination of the LN-ID1 and the IP address=IP1 acquired from the IP address managing server 34 in the LN-HA 12. Moreover, the xSP server 71 acquires the IP address=IP1 corresponding to the LN-ID1 from the database 124 of the LN-HA 12 and transmits the streaming contents or the like to the IP address=IP1.

Incidentally, in this case, the IP address managing server 34 is equal to the GN-HA 12. That is, according to the present invention, the GN-HA 12 is for converting an IP address [from a home address (HoA) to a care of address (CoA)], while the IP address managing server 34 is merely a server for allocating the IP address.

(C4) Modification of Network Including Gateway 2 (supplementary Description 4)

The aforesaid gateway 2 is not necessarily a technique specified to the mobile IP.

For example, as shown in FIG. 38, it is also possible that the GN 4-*i* directly registers its own IP address (GN-ID) in the LN-HA 12 (step A2'). In this case, since the GN-HA 11 equivalent to the home agent of the mobile IP shown in FIG. 9 does not exist, in a stepA 5 of FIG. 38, the gateway can directly convert the IP address into the IP address of the GN 4-1 instead of the address of the GN-HA 12. The other operation is basically the same as the operation (steps A1, A3 to A4, A6 to A8) mentioned above with reference to FIG. 4.

Thus, also in this modification, as well as the above-described embodiments, in a network configuration comprising the carrier network 3 and the xSP network 7, when the carrier network 3 is configured with the IPv6 address system or the like, it is possible to prevent the information on a thing (appliance) possessed by the user having an IPv6 address from being notified to the xSP server 71.

Accordingly, as a business mode, for example, in a case in which the network carrier pays fixed contents charges to the xSP, the information the network carrier notifies to the xSP is not always required to be subscriber information itself such as IPv6 address, and since it is considered that the information is about a thing the subscriber possesses or about a position thereof, as mentioned above, the gateway 2 according to this embodiment provides the effects of concealing the subscriber information, which is not required to be notified from the network carrier to the xSP server 71. Incidentally, even in a case in which the network carrier and the xSP are replaced with an enterprise and an xSP, this type of network provider configuration works out.

(C5) Others

It is also possible to properly combine one or more functions of cooperation managing facilities 1 (GN-HA 11, LN-HA 12), each of which has described in the aforesaid embodiment, as needed.

It should be understood that the present invention is not limited to the above-described embodiments, and that it is intended to cover all changes and modifications of the embodiments of the invention herein which do not constitute departures from the spirit and scope of the invention.

As described above in detail, according to the present invention, it is possible to realize a context aware service including appliances around a user, for example, a service of appropriately carrying out the information distribution according to a user's terminal device or an appliance around the user. Therefore, the present invention is extremely effective in industrial fields of providing such services.

What is claimed is:

1. A cooperation information managing apparatus made to manage cooperation information in a system including a first unit retaining a first identifier and a second unit retaining a second identifier for reading out said first identifier from said first unit to transmit, as said cooperation information, a combination of said first identifier and said second identifier, said cooperation information managing apparatus comprising:
   shared number retaining means for retaining the number of second units currently using said first unit (which will be referred to hereinafter as "current use number") and an upper limit value of the number of second units capable of sharing said first unit according to said first identifier;
   sharing control means for, upon receipt of said cooperation information from said second unit, making a decision on whether or not said first unit is available for said second unit that sends said cooperation information by controlling the sharing of said first unit among said second units on the basis of each of said identifiers included in said cooperation information and said current use number and upper limit value in said shared number retaining means; and
   signal issuing means for issuing a control signal for controlling a state of said first unit to said second unit if the decision result by said sharing control means is positive, and issuing a notification signal for notifying an unavailable state of said first unit to said second unit if the decision result by said sharing control means is negative.

2. A cooperation information managing apparatus made to manage cooperation information in a system, the system including a first unit retaining a first identifier to be read out by a different apparatus, a second unit retaining a second identifier for reading out said first identifier from said first unit to transmit, as said cooperation information, a combination of said first identifier and said second identifier, and a third unit combining a function of said first unit and a function of said second unit, said cooperation information managing apparatus comprising:
   first receiving means for receiving, as first cooperation information from said third unit, a combination of said first identifier of said first unit and a third identifier retained in said third unit, said first identifier is read out from said first unit by said third unit, said third unit functioning as said second unit;
   second receiving means for receiving, as second cooperation information from said second unit, a combination of a fourth identifier retained in said third unit and said second identifier retained in second unit, said fourth identifier is read out by said second unit from said third unit, the second unit reads out said first identifier of said first unit, said third unit functioning as said first unit;
   storing means for storing said cooperation information and said third identifier and said fourth identifier in association with each other;
   cooperation information registration control unit for registering, in said storing means, said first cooperation information received by said first receiving means and said second cooperation information received by said second receiving means in association with each other based on the association between said third identifier and said fourth identifier; and
   issuing means for issuing, using said first cooperation information or said second cooperation information registered in said storing means by cooperation information registration control unit, said second identifier corresponding to said first identifier of said first unit to an information providing server that sends information about said first unit, in response to a request, which is from said information providing server itself, to said second unit for said information.

3. The cooperation information managing apparatus according to claim 2, wherein said cooperation information registration control unit includes association deleting means for, upon receipt of a request for cancellation of the association from said third unit, deleting the association between said first cooperation information and said second cooperation information in said storing means.

4. The cooperation information managing apparatus according to claim 3, wherein said cooperation information registration control unit further includes:
   monitoring means for monitoring production and cancellation of the association between said first cooperation information and said second cooperation information in said storing means; and
   a transmission destination change instructing means for, when said monitoring means confirms the production of the association, recognizing that the unit using said first unit is changed from said third unit to said second unit and transmitting, to the source of information on said first unit, an instruction for changing the receiving side of the information on said first unit to said second unit and for, when said monitoring means confirms the cancellation of the association, recognizing that the unit using said first unit is changed from said second unit to said third unit and transmitting, to the source, an instruction for changing the receiving side of the information on said first unit to said third unit.

5. A gateway apparatus for use in a cooperation information managing system including a first unit retaining a first identifier, a second unit retaining a second identifier for reading out said first identifier from said first unit to transmit, as cooperation information, a combination of said first identifier and said second identifier, a cooperation information managing apparatus for receiving and managing said cooperation information and an information providing server for transmitting information about said first unit, said gateway apparatus comprising:
   receiving means for receiving, from said cooperation information managing apparatus, said second identifier needed when said information providing server transmits information on said first unit to said second unit, which reads out said first identifier of said first unit;
   identifier converting means for concealing from the information providing server said second identifier, received by said receiving means, by converting said second identifier into a third identifier for notification to said information providing server;
   transmitting means for transmitting the third identifier after being converted by said identifier converting means, to said information providing server; and
   information transferring means for inverse-converting the third identifier, added to information from said information providing server, into the second identifier before the conversion to transfer the inverse-converted identifier to said second unit,
   wherein said first unit is an appliance designed or used as means for providing a specific service or information to a person.

* * * * *